(12) United States Patent
Fujita et al.

(10) Patent No.: US 7,085,011 B2
(45) Date of Patent: Aug. 1, 2006

(54) COLOR PROOFING APPARATUS AND METHOD OF MAKING COLOR PROOF

(75) Inventors: Katsushi Fujita, Tokyo (JP); Tohru Hoshino, Tokyo (JP); Hiroaki Tajima, Tokyo (JP); Masato Doi, Tokyo (JP)

(73) Assignee: Konica Corporation, Tokyo (JP)

( * ) Notice: Subject to any disclaimer, the term of this patent is extended or adjusted under 35 U.S.C. 154(b) by 1005 days.

(21) Appl. No.: 10/047,085

(22) Filed: Jan. 14, 2002

(65) Prior Publication Data

US 2002/0097437 A1    Jul. 25, 2002

(30) Foreign Application Priority Data

Jan. 19, 2001  (JP)  .............................. 2001-011546
Jan. 30, 2001  (JP)  .............................. 2001-021136

(51) Int. Cl.
  *G06K 15/00*  (2006.01)
  *G06K 9/00*   (2006.01)
  *B41J 1/00*   (2006.01)
  *G03F 3/08*   (2006.01)

(52) U.S. Cl. ....................... 358/2.1; 358/1.9; 358/518; 382/162; 382/167

(58) Field of Classification Search ................ 358/1.9, 358/529, 518–520, 524, 530, 534, 501–503, 358/1.16, 2.1; 382/162, 167
See application file for complete search history.

(56) References Cited

U.S. PATENT DOCUMENTS 6,160,912 A *  12/2000  Usami ......................... 382/167
6,778,300 B1 *  8/2004  Kohler ....................... 358/529

* cited by examiner

*Primary Examiner*—Kimberly Williams
*Assistant Examiner*—Charlotte M. Baker
(74) *Attorney, Agent, or Firm*—Frishauf, Holtz, Goodman & Chick, P.C.

(57) ABSTRACT

An apparatus for making a color proof based on an image signal including yellow, magenta, cyan and black component data Y, M, C, K for each pixel, comprises; an image signal input section to receive the image signal; a black component correcting section to correct the black component data K on the basis of the yellow, magenta and cyan component data Y, M, C for each pixel in accordance with a predetermined black component correcting condition; an image signal output section to output an image signal including yellow, magenta, cyan and corrected-black component data Y, M, C, K'; and a color proof making section to expose a silver halide light sensitive material based on the outputted image signal with a plurality of light sources different in wavelength and to make a color proof sheet for each color of yellow, magenta, cyan and black.

11 Claims, 22 Drawing Sheets

RANDOM SIGNAL   VERTICAL STRIPES   HORIZONTAL STRIPES   GRID   HALFTONE DOTS

FIG. 15

| PRINT DATA | | | | Red LASER INTENSITY | Green LASER INTENSITY | Blue LASER INTENSITY | REPRODUCED COLOR BY EXPOSURE |
|---|---|---|---|---|---|---|---|
| BK | C | M | Y | | | | |
| 0 | 0 | 0 | 1 | 100 | 100 | | Y |
| 0 | 0 | 1 | 0 | 100 | 0 | 100 | M |
| 0 | 1 | 0 | 0 | 0 | 100 | 100 | C |
| 0 | 1 | 1 | 0 | 0 | 0 | 100 | B |
| 0 | 1 | 0 | 1 | 0 | 100 | 0 | G |
| 0 | 0 | 1 | 1 | 100 | 0 | 0 | R |
| 0 | 1 | 1 | 1 | 0 | 0 | 0 | GY |
| 0 | 0 | 0 | 0 | 100 | 100 | 100 | W |
| 1 | 0 | 0 | 0 | 0 | 0 | 0 | K |
| 1 | 0 | 0 | 1 | 0 | 0 | 0 | |
| 1 | 0 | 1 | 0 | 0 | 0 | 0 | |
| 1 | 0 | 1 | 1 | 0 | 0 | 0 | |
| 1 | 1 | 0 | 0 | 0 | 0 | 0 | |
| 1 | 1 | 0 | 1 | 0 | 0 | 0 | |
| 1 | 1 | 1 | 0 | 0 | 0 | 0 | |
| 1 | 1 | 1 | 1 | 0 | 0 | 0 | |

FIG. 16

| REFERENCE COLOR | | CORRESPONDING LASER INTENSITY | | |
|---|---|---|---|---|
| | | R | G | B |
| | Y | 100 | 100 | 0 |
| | M | 100 | 0 | 100 |
| | C | 0 | 100 | 100 |
| | B | 0 | 0 | 100 |
| | G | 0 | 100 | 0 |
| | R | 100 | 0 | 0 |
| | K | 0 | 0 | 0 |
| | GY | 0 | 0 | 0 |
| | W | 100 | 100 | 100 |

FIG. 17

| | | CORRESPONDING LASER INTENSITY | | |
|---|---|---|---|---|
| | | R | G | B |
| REFERENCE COLOR | Y | 100 | 100 | 0 |
| | M | 100 | 0 | 100 |
| | C | 0 | 100 | 100 |
| | B | 0 | 0 | 100 |
| | G | 0 | 100 | 0 |
| | R | 100 | 0 | 0 |
| | K | 0 | 0 | 0 |
| | GY | 0 | 0 | 0 |
| | W | 100 | 100 | 100 |
| | SP | a | b | c |

FIG. 18

COLOR CORRECTION SETTING (%)

CHANNEL 1

112 LUT FOR CANNEL 1:

| | | R | G | B |
|---|---|---|---|---|
| REFERENCE COLOR | Y | 100 | 100 | 0 |
| | M | 100 | 0 | 100 |
| | C | 0 | 100 | 100 |
| | B | 0 | 0 | 100 |
| | G | 0 | 100 | 0 |
| | R | 100 | 0 | 0 |
| | K | 0 | 0 | 0 |
| | GY | 0 | 0 | 0 |
| | W | 100 | 100 | 100 |

113 TEN-KEY:

| 1 | 2 | 3 |
|---|---|---|
| 4 | 5 | 6 |
| 7 | 8 | 9 |
| | 0 | |

MENU  CLEAR  ENTER

116 ENTER KEY  115 CLEAR KEY  114 MENU KEY

COLOR PROOFING APPARATUS AND METHOD OF MAKING COLOR PROOF

BACKGROUND OF THE INVENTION

This invention relates to a color proofing apparatus and a method of making a color proof, and in particular, to a method of making a color proof by exposing a silver halide color photosensitive material to light from a plurality of light sources of different wavelengths, on the basis of halftone dot image data which have been processed by an RIP (Raster Image Processor), and a color proofing apparatus employing the method.

In producing color prints, sometimes color correction is practiced at the stage of the original films; it has been put in practice that the objects for correction (color proofs) are prepared by using color-separated halftone dot original films which have been produced by color separation into a C (cyan) separation, an M (magenta) separation, a Y (yellow) separation, and a K (black) separation, and before making a proper printing plate, it is inspected whether or not an error is made in the layout, the colors, and the letters of the original films, to confirm the finished state of the printed objects beforehand.

In recent years, making color proofs has been practiced by employing a DDCP (direct digital color proof) method. For one of the techniques of the DDCP method, such one that a silver halide color photosensitive material is exposed to a combination of a plurality of light spots having different wavelengths respectively such as R, G, and B for example, on the basis of halftone dot image data of the respective color-separated halftone dot originals, to develop respective color dots of the above-mentioned C, M, Y, and K.

Incidentally, in recent years, by the spread of DTP (Desk Top Publishing) etc., an operation such that an image inputted from a scanner is edited and a page layout is conducted on a computer software has been generalized, and edition in a full digital way has become not so rare.

In such a process, for further making the efficiency higher, the following are practiced: image setter outputting to directly output image data that have been subjected to page edition to a film, CTP (Computer to Plate) outputting to carry out direct image recording on a printing plate, and further, CTC (Computer to Cylinder) process to carry out direct image recording on a printing plate wound on a cylinder of a printing machine.

In this case, there is a problem that carrying out proofing by prints or proofing by means of other proof materials through once outputting to a film or to a printing plate for the confirmation of the correction only results in ineffective use of films or printing plates and too many extra operations.

For that reason, in particular, in the process to carry out image making and editing in a full digital way by a computer as described in the above, a system for practicing direct color image outputting which is called DDCP (Direct Digital Color Proof) or DCP (Digital Color Proof) is required.

In such a DDCP system, before recording on a film for plate making by means of an image setter from digital image data processed on a computer, a final printing operation to directly make a printing plate by CTP, direct image recording on a printing plate wound on the cylinder of a printing machine by CTC, or the like is carried out, it is produced a color proof which reproduces the object of output expressed by a digital image having been processed on a computer, to confirm the pattern of the picture, the color tone, the letters and sentences, etc.

Further, in a correction process in such printing processes, proofs are produced and used mainly in the following three uses:

(1) The confirmation of mistakes in the inside of the operation site, that is, the inside correction;

(2) The outside correction to be submitted to the order making person and the designer for the confirmation of the finish; and (3) The print sample to be submitted to the operator of the printing machine as the sample of the final printed object.

In these cases, in the use for the inside confirmation, and in a part of the outside correction use, from the requirement for shortening the delivery time, the cost reduction, etc., there are some cases where a material for proofing incapable of reproducing a halftone dot image, in other words, a print produced by a sublimation transfer method, or an outputted print by an ink jet or electrophotographic method is used as a proof for the confirmation of the outline; however, it is an actual situation that, for the confirmation of the reproducibility of highlight areas and the fine details, and the confirmation of the unsuitable interference of a halftone dot image called a moire produced in printing, a proof which reproduces printed halftone dots in a high fidelity is strongly required.

For such needs, it has begun to spread in recent years DDCP of a type in which an image formed on a sublimation transfer recording material or a heat-sensitive recording material by an image exposure using a high-power heat mode laser is transferred to a printing paper sheet; however, in this system, it makes a problem that the cost of the laser head is high, the equipment is high-priced, the material is also high-priced because of the utilization of a number of color image forming sheets, and the processes from image exposure to transfer are necessary for each of the number of colors, which requires a long time; there is a problem that it is difficult in respect of the cost and time to apply the method to all jobs, or to produce a number of duplicates as conventional print proofs.

Therefore, for an apparatus to make such a color proof, it is proposed an image recording apparatus having a drum provided with a plurality of through holes penetrating from the outer peripheral surface to the inside, and a rotation driving mechanism for rotating said drum, and carrying out an exposure in accordance with digital image signals as holding a photosensitive material on said drum which are being rotated by said rotation driving mechanism, to record a halftone dot image.

Incidentally, the employment of DTP has been in process of development in recent years, and it has become possible to overlap picture patterns freely by an image processing software on a personal computer. Therefore, images including black ink, in which black print and one or some of prints of other colors overlaps each other without being recognized by the user, are increasing.

In this case, on the display of a personal computer, the areas where a black separation and one or some of separations of other colors overlap each other all look as black-colored. Therefore, the user cannot notice the state that separations of other colors, which are actually unnecessary, overlap the black separation.

Further, also in DDCP, because an image having a black print and one or some of prints of other colors overlapping each other is expressed by a black color, the overlapping areas all look as black-colored; therefore, a user cannot notice the state that a black print and one or some of prints of other colors overlap each other.

However, when actual printing is carried out, because an area of only black print and an area having black prints and one or some of prints of other colors overlapping each other (hereinafter referred to as "black-overlaid print" in this specification) look different, the user can notice that unnecessary prints of other colors overlap the black print for the first time. That is, it was not until printing was practiced that the user noticed a mistake in the image processing stage; therefore, it has been usual that a big uselessness in operation time and various kinds of materials was produced.

This invention has been made in view of such problems, and it is its object to provide an image data outputting apparatus capable of discriminating between the case where a certain color is overlaid with black and the case where only black is present.

It is another object of the invention to actualize a method of making a color proof and a color proofing apparatus capable of discriminating between the area of only a black print and the area of a black-overlaid print.

SUMMARY OF THE INVENTION

Means for solving the above-mentioned problems are as follows:

(1) A method of making a color proof by exposing a silver halide photosensitive material to lights from a plurality of light sources having different wavelengths respectively on the basis of halftone dot image data, characterized by it that, in respect of image data of C, M, Y, and K, the gradation characteristic or the color tone characteristic is corrected, and for said image data of C, M, Y, and K after correction, in the case where the image data K is not smaller than a first boundary value and the maximum value of the image data C, M, or Y is not smaller than a second boundary value, a correction for lowering the image data K in a specified proportion in accordance with the value of the image data K and the maximum value of the image data C, M, or Y is carried out, to produce and output halftone dot image data of halftone dot area ratios on the basis of the image data C, M, Y, and K, in which K has been corrected.

(2) An apparatus for making a color proof by exposing a silver halide photosensitive material to lights from a plurality of light sources having different wavelengths respectively on the basis of halftone dot image data, characterized by it that said apparatus for making a color proof is provided with a data converting means which corrects, in respect of image data of C, M, Y, and K, the gradation characteristic or the color tone characteristic, and for said image data of C, M, Y, and K after correction, in the case where the image data K is not smaller than a first boundary value and the maximum value of the image data C, M, or Y is not smaller than a second boundary value, carries out a correction for lowering the image data K in a specified proportion in accordance with the value of the image data K and the maximum value of the image data C, M, or Y, to produce and output halftone dot image data of halftone dot area ratios on the basis of the image data C, M, Y, and K, in which K has been corrected.

These inventions has a structure such that, in making a color proof by exposing a silver halide photosensitive material to lights from a plurality of light sources having different wavelengths respectively on the basis of halftone dot image data, in respect of image data of C, M, Y, and K, the gradation characteristic or the color tone characteristic is corrected, and for said image data of C, M, Y, and K after correction, in the case where the image data K is not smaller than a first boundary value and the maximum value of the image data C, M, or Y is not smaller than a second boundary value, a correction for lowering the image data K in a specified proportion in accordance with the value of the image data K and the maximum value of the image data C, M, or Y is carried out, to produce and output halftone dot image data of halftone dot area ratios on the basis of the image data C, M, Y, and K, in which K has been corrected.

That is, in the case where the image data K (black color) is not smaller than a first boundary value, and the maximum value of the image data C, M, and Y are not smaller than a second boundary value, a correction to lower the image data K (black color) in a specified proportion is carried out, and then, halftone image data are produced.

Therefore, a color proof capable of discriminating between the area of only a black print and the area of black-overlaid print can be produced.

In addition, it is desirable the aforesaid first boundary value is not smaller than 50% and smaller than 100% as converted into halftone dot area ratio expressed by percent.

Further, it is desirable that the aforesaid second boundary value is not smaller than 0% and smaller than 80% as converted into halftone dot area ratio expressed by percent.

Further, it is desirable that the aforesaid correction to lower the image data K is done in accordance with the value of the image data K and the maximum value of the image data C, M, or Y, and is practiced in such a manner as to decrease the K value by 10% at the maximum decrement.

(3) An apparatus for outputting image data characterized by it that, when each of image data Y, M, C, and K after dot generating takes one of the values (1, 0), and a relation between them and another signal Q which takes one of the values (1, 0) in the same way is expressed by $$((Y \text{ or } M \text{ or } C) \text{ and } K) \text{ and } Q=1,$$

the image data K is made equal to zero (K=0).

By making the apparatus such one, in the case where any one of the Y, M, and C colors and K overlap each other, by selectively making K equal to zero by the signal Q, it becomes possible to recognize an image which exists overlaid with K image.

(4) An apparatus for outputting image data as set forth in (3), characterized by it that, when each of image data Y, M, C, and K takes one of the values (1, 0), and in the (n×n) pixels area centering on the objective pixel of the K signal, if all the pixels in the area is "1", K' is made equal to 1 (K'=1), and if there is only one "0", K' is made equal to zero (K'=0), and when a relation with another signal Q is expressed by $$((Y \text{ or } M \text{ or } C) \text{ and } K') \text{ and } Q=1,$$

the image data K is made equal to zero (K=0).

By making the apparatus such one, halftone dots of K in the image area can be prevented from disappearing.

BRIEF DESCRIPTION OF THE DRAWINGS

FIG. 15 is a drawing showing an example of an LUT in an apparatus of an example of the embodiment of this invention;

FIG. 16 is a drawing showing an example of an LUT in an apparatus of an example of the embodiment of this invention;

FIG. 17 is a drawing showing an example of an LUT in an apparatus of an example of the embodiment of this invention;

FIG. 18 is a drawing showing the screen for color correction setting in an apparatus of an example of the embodiment of this invention;

DETAILED DESCRIPTION OF THE PREFERRED EMBODIMENT

In the following, with reference to the drawings, the embodiment of this invention will be explained in detail. In addition, this invention should not be limited to the embodiment.

Figure 8:
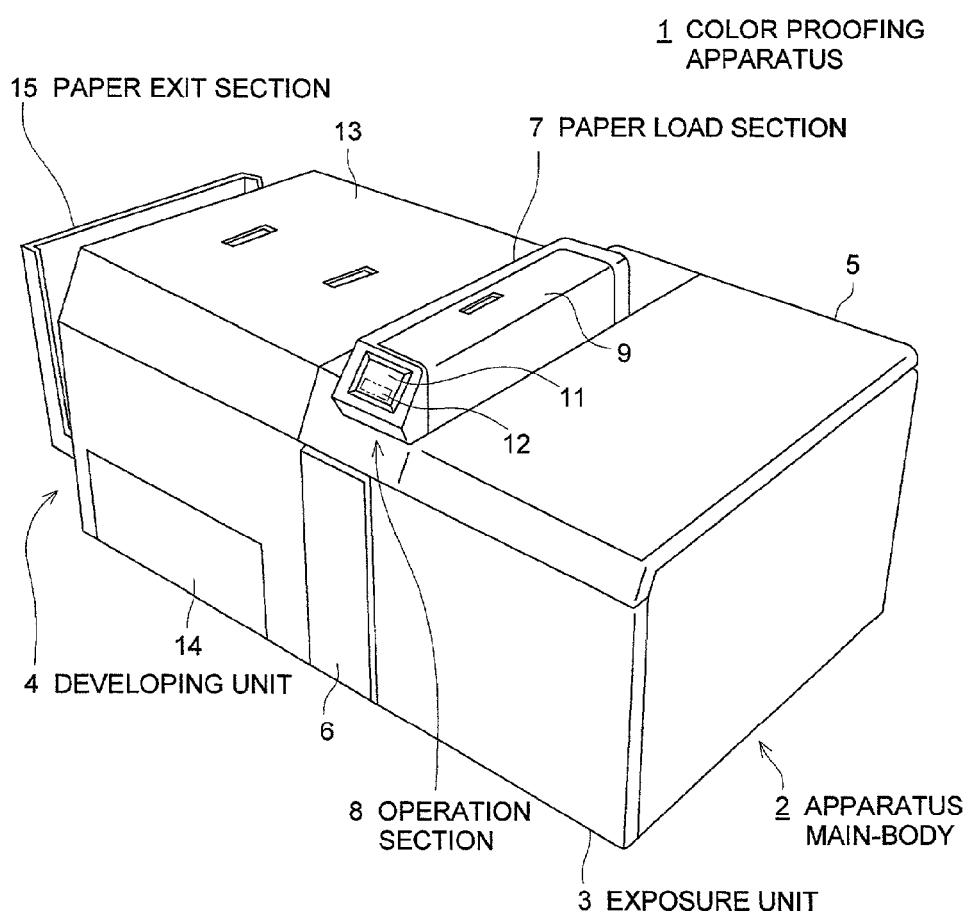
FIG. 8 is a perspective view showing the appearance of an apparatus of an example of the embodiment of this invention.
Figure 9:
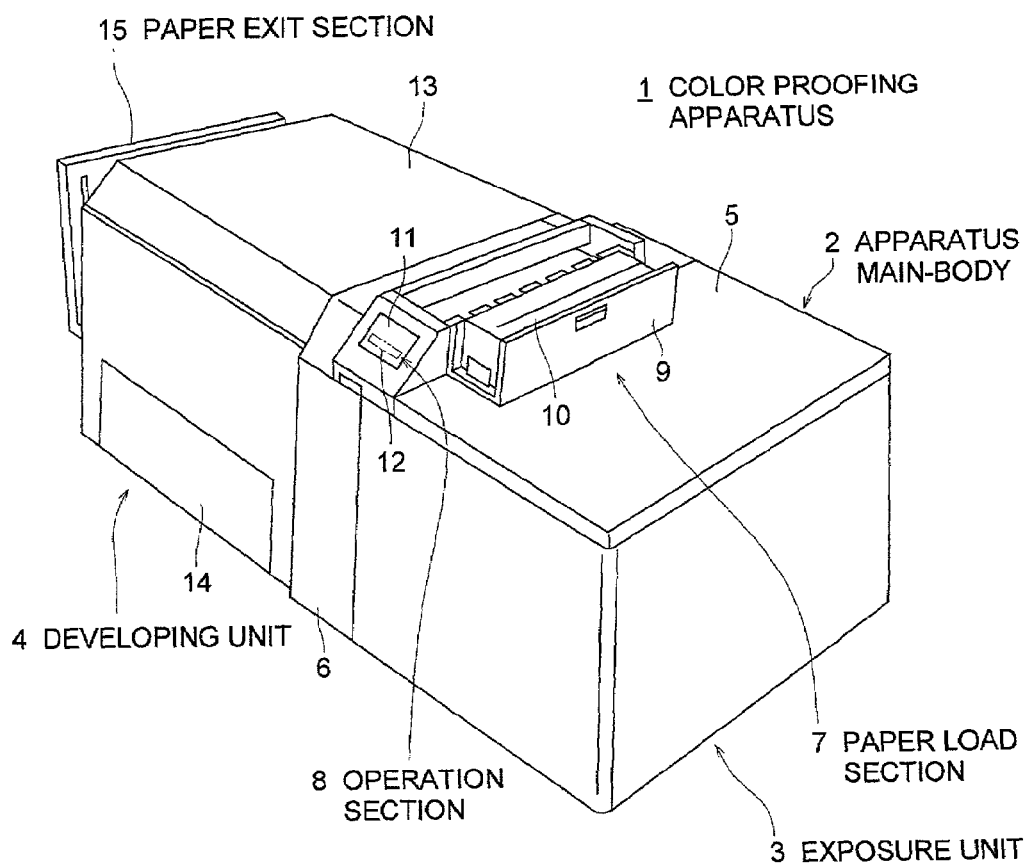
FIG. 9 is a perspective view showing the appearance of an apparatus of an example of the embodiment of this invention.
Figure 10:
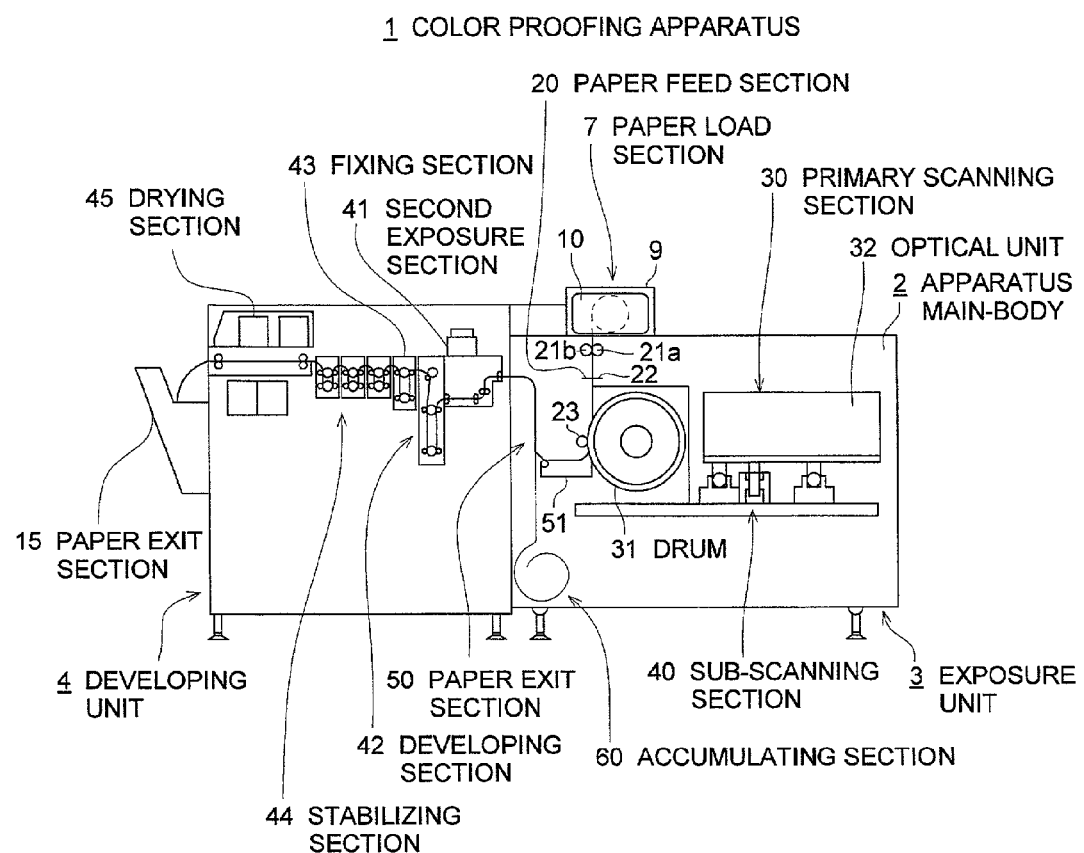
FIG. 10 is a schematic drawing showing the internal structure of an apparatus of an example of the embodiment of this invention.

A color proofing apparatus is shown in FIG. 8 to FIG. 10. FIG. 8 is a perspective view of the color proofing apparatus, FIG. 9 is a perspective view of the color proofing apparatus with its paper feed cover opened, and FIG. 10 is a schematic drawing of the internal structure of the color proofing apparatus. This apparatus is an example of the embodiment of this invention. By the structure of this apparatus, an example of the embodiment of this invention can be shown. Further, by the operation of this apparatus, an example of the embodiment of an apparatus of this invention can be shown.

In the apparatus main-body 2 of the color proofing apparatus 1, an exposure unit 3 and a developing unit 4 is provided. The exposure unit 3 is provided with a top panel 5 and a front panel 6, both being capable of being opened and closed, and maintenance is carried out from the top side and the front side. On the upper surface of the exposure unit 3, a paper load section 7 is disposed near the developing section, and at the front side of this paper load section 7, that is, at the front side of the apparatus main-body 2, an operation section 8 is arranged. In the paper load section 7, a paper feed cover 9 is provided in such a manner as to be able to be opened and closed, which makes it possible to set a cartridge 10 containing a photosensitive material (hereinafter referred to as a paper or a sensing material). In the operation section 8, a liquid crystal panel 11 and a touch panel 12 are provided.

In the developing unit 4, a top panel 13 and a replenishment panel 14 are provided in such a manner as to be able to be opened and closed; maintenance is carried out from the top side, and the replenishment of the processing liquid is carried out from the front side. At the side part of the developing unit 4, there is provided a paper exit section 15, to which processed photosensitive materials are ejected.

FIG. 10 is a drawing showing the outline structure of the color proofing apparatus. The exposure unit 3 is equipped with a paper feed section 20, a primary scanning section 30, a sub-scanning section 40, a paper exit section 50, and an accumulating section 60. The paper feed section is provided with paper feed rollers 21a and 21b, a cutter 22, and a paper feed/discharge roller for drum 23. A roll of photosensitive material is drawn out from the cartridge 10 by the paper feed rollers 21a and 21b, and a sheet having a specified length is cut off by the cutter 22, to be sent to the primary scanning section 30 through the paper feed/discharge roller for drum 23.

In the primary scanning section 30, there is provided a drum 31 capable of rotating, and a sheet of photosensitive material is attracted on the outer surface of the drum 31 to rotate as a unified body. An optical unit 32 is arranged facing toward the drum 31, and the optical unit 32 is capable of moving parallel to the drum axis by means of the sub-scanning section 40. The optical unit practices image writing by exposing the photosensitive material sheet attracted to the drum 31 to laser beams in accordance with digital image signals.

The paper exit section 50 is provided with a separation guide 51, and by this separation guide 51, the photosensitive material sheet to which writing has been finished is picked off the drum 31, to be sent to the developing unit 4. At this time, if the transport speed of the developing unit 4 is slower than the ejection speed of the exposure unit 3, the sheet is fed into the accumulating section 60 with its ejection speed kept at the higher speed, to be accumulated as hanging down in the accumulating section 60; thus, the transport timing is adapted to that of the developing unit 4, which results in the processing capacity of the exposure unit 3 being kept not lowered.

The developing unit 4 is equipped with a second exposure section 41 (hereinafter description is made with a reversal exposure direct positive photosensitive material taken for instance), a developing section 42, a fixing section 43, a stabilizing section 44, and a drying section 45. By the second exposure section 42, latent image elements are formed in areas of the photosensitive material sheet which have not been exposed to light by the exposure unit 3, the photosensitive material sheet having been subjected to the second exposure is transported to the developing section 42, fixing section 43, and the stabilizing section 44, to be developprocessed, and this processed photosensitive material sheet is dried in the drying section 45, to be sent out to the paper exit section 15.

Figure 11:
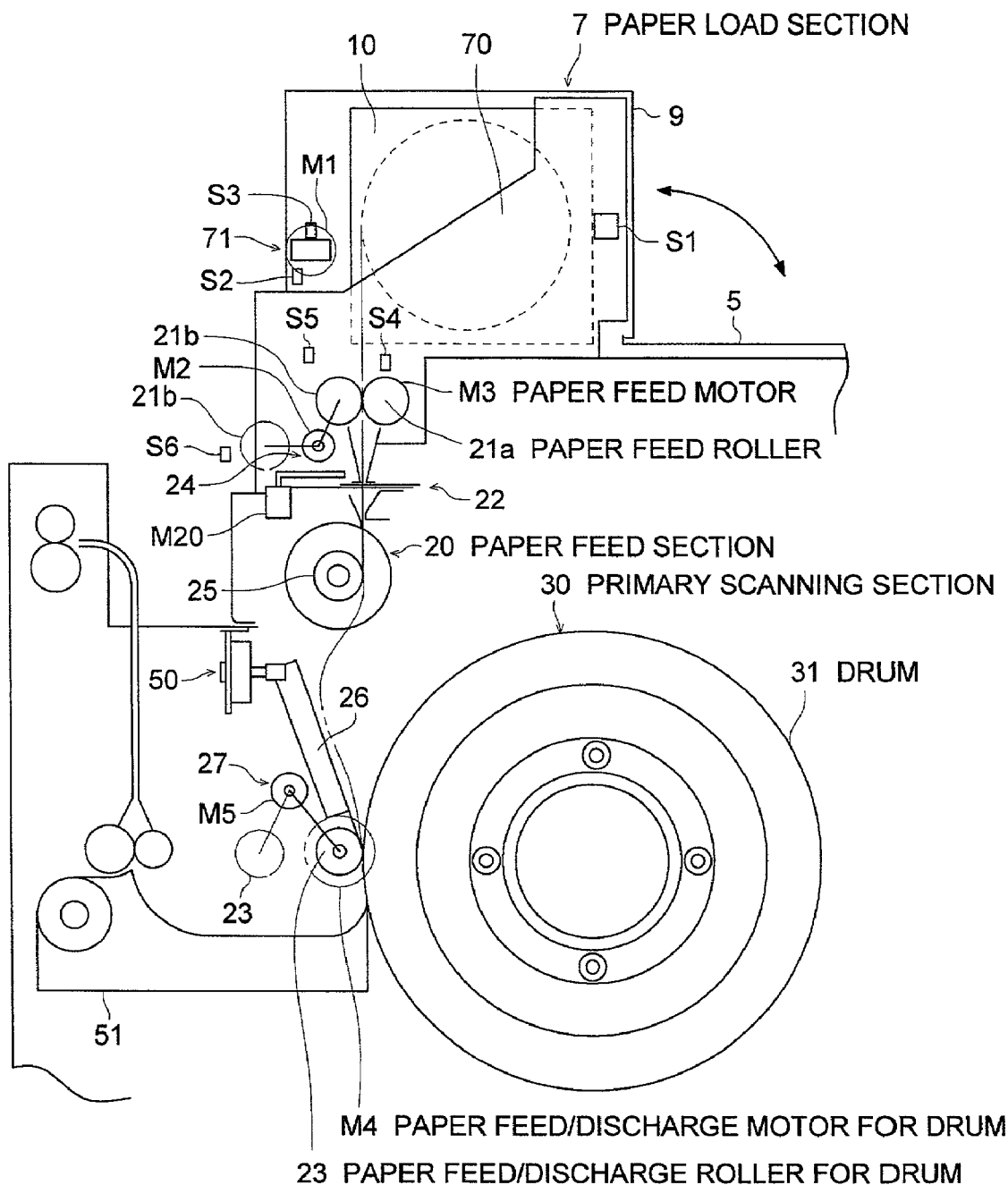
FIG. 11 is a schematic drawing showing a part of the internal structure of an apparatus of an example of the embodiment of this invention.
Figure 12:
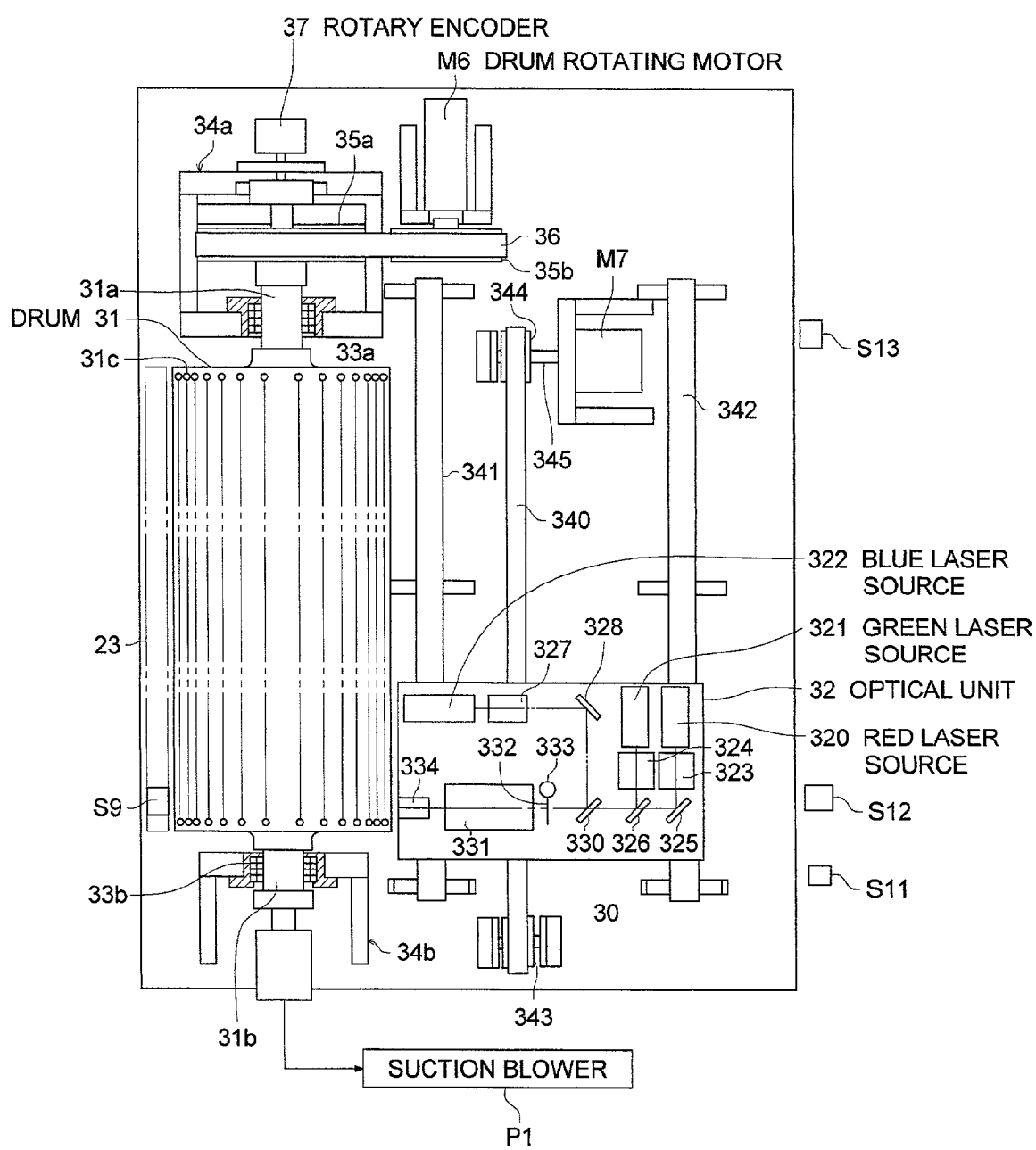
FIG. 12 is a schematic drawing showing a part of the internal structure of an apparatus of an example of the embodiment of this invention.
Figure 13:
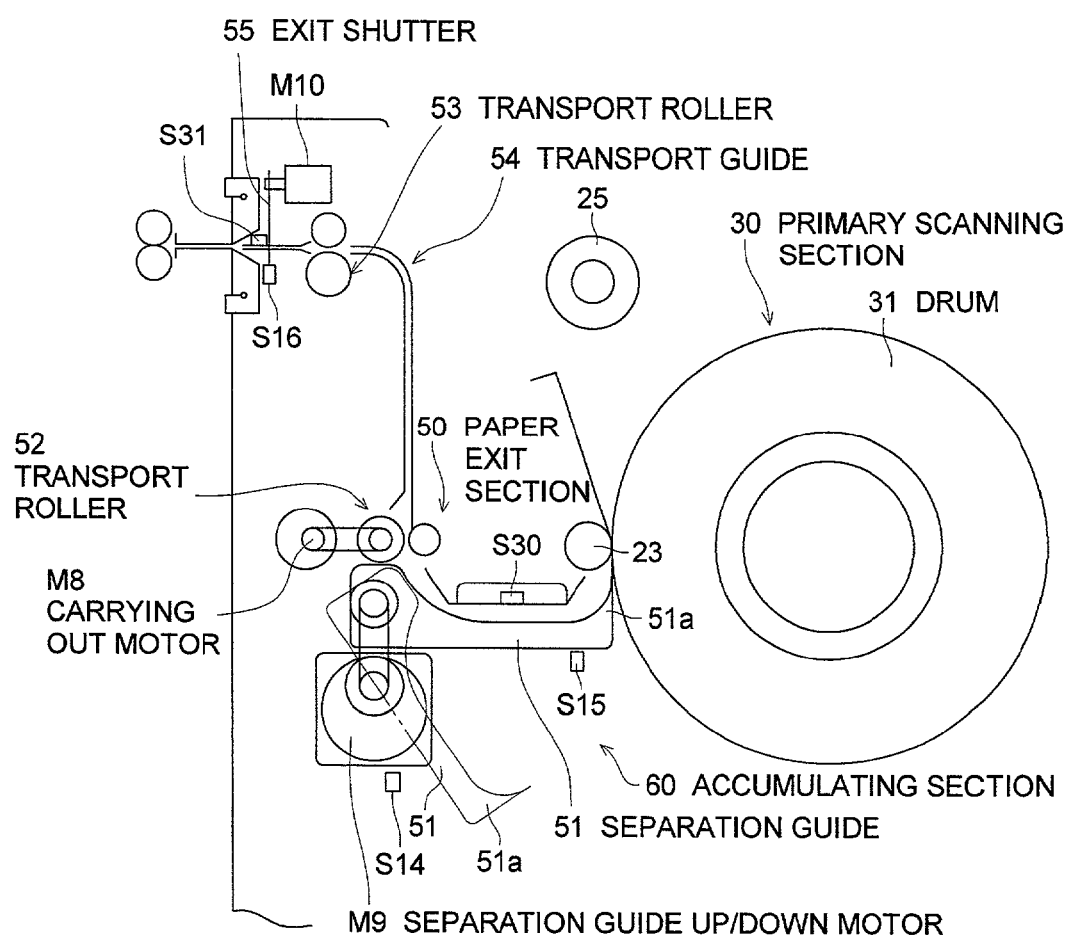
FIG. 13 is a schematic drawing showing a part of the internal structure of an apparatus of an example of the embodiment of this invention.

Next, the structure of every part of the color proofing apparatus will be explained in detail with reference to FIG. 10 to FIG. 13. FIG. 11 is a side view showing the paper load section and the paper feed section, FIG. 12 is the plan view showing the primary scanning section and the sub-scanning section, and FIG. 13 is a side view showing the paper exit section and the accumulating section.

In the paper load section 7, the paper feed cover 9 is provided at the top panel 5 in such a manner that it can be opened and closed, and the cartridge 10 is set to the opening for loading 70 with the paper feed cover 9 kept opened. The paper feed cover 9 is closed with the cartridge 10 kept set, and the paper feed cover 9 is locked by a lock mechanism 71. The lock mechanism 71 is operated by a cover lock motor M1. In the paper feed cover 9, a cartridge presence sensor S1 is provided, and at the opening for loading 70, a cover close sensor S2 and a cover lock sensor S3 are provided. The cartridge 10 is set at the position of the paper feed rollers 21a and 21b of the paper feed section 20, in the state where the leading edge of the photosensitive material roll is drawn out to a specified length.

In the paper feed section 20, a paper end sensor S4 is provided between the paper feed rollers 21a and 21b and the cartridge 10, and by this paper end sensor S4, the ending edge of the photosensitive material roll drawn out from the cartridge 10 is detected. The position of the one paper feed roller 21a is fixed, the other paper feed roller 21b can be moved by a roller moving mechanism 24, and the paper feed roller 21b is moved to a waiting position except during the paper transport operation in order to prevent the generation of creasing to be caused by the pressing of the rollers. The roller moving mechanism 24 is operated by a feed roller releasing motor M2.

During the transport of the photosensitive material, the paper feed roller 21b is moved back to the transport position to press the photosensitive material between the pair of paper feed rollers 21a and 21b. The position of the paper feed roller 21b is detected by a feed roller pressing position sensor S5 and a feed roller releasing position sensor S6. The paper feed roller 21a is operated by a paper feed motor M3.

The cutter 22 is operated by a cutter motor M20. Between the cutter 22 and the paper feed/discharge roller for drum 23, an encoder roller 25 and a guide 26 are provided. The encoder roller 25 transports a photosensitive material by its rotation and detects the feeding amount of the photosensitive material.

The paper feed/discharge roller for drum 23 can be moved between the pressing position and the releasing position by a roller moving mechanism 27. This paper feed/discharge roller for drum 23 is driven by a paper feed/discharge motor for drum M4. The position of the paper feed/discharge roller for drum 23 is detected by a roller pressing position sensor S7 for paper feed/discharge for drum and a roller releasing position sensor S8 for paper feed/discharge for drum, both of which are not shown in the drawing. The roller moving mechanism 27 is operated by a roller press/release motor MS for paper feed/discharge for drum.

The shaft portions 31a and 31b at the both ends of the drum 31 in the primary scanning section 30 is supported rotatably by supporting bases 34a and 34b through bearings 33a and 33b. At the one shaft portion 31a of the drum 31, a drive pulley 35a is provided, and this drive pulley 35a is connected to an output pulley 35b of a drum rotating motor M6 by a belt 36, to rotate the drum 31 by the driving of the drum rotating motor M6. Further, at the one shaft portion 31a of the drum 31, a rotary encoder 37 is provided, to be used for the control of the pixel clock which is synchronized with the drum rotation by outputting rotation pulses.

The other shaft portion 31b of the drum 31 is connected to a suction blower P1. The drum 31 is formed of a hollow body, and attraction holes 31c are formed on its surface; the inside pressure of the drum 31 is reduced by the driving of the suction blower P1, and a photosensitive material is attracted on the surface of the drum 31.

In the optical unit 32, a red laser light source (He—Ne) 320, a green laser light source (He—Ne) 321, a blue laser light source (Ar) 322 are arranged. A photosensitive material on the drum 31 is exposed to an image by means of the laser beams from the red laser light source 320 and the green laser light source 321 through AOM's (acousto-optic element for controlling the intensity of light) 323 and 324 and mirrors 325 and 326 respectively and the laser beam from the blue laser light source 322 through an AOM 327 and a mirror 330, all the laser beams being applied through a converging lens 331 and an image forming lens 334. An exposure shutter 332 carries out the opening and closing of the optical path at the start and end of the exposure by a exposure solenoid 333 opening and shutting the shutter.

The optical unit 32 is provided in such a manner that it is fixed to a moving belt 340 and is capable of moving in the direction parallel to the drum axis as being guided by a pair of guide rails 341 and 342. The moving belt 340 is entrained around a pair of pulleys 343 and 344; the one pulley 344 is connected to the output shaft 345 of a sub-scanning motor M7, and the optical unit 32 is moved parallel to the drum axis by the driving of the sub-scanning motor M7.

A sub-scanning reference position sensor S11, a subscanning writing position sensor S12, and a sub-scanning overrun position sensor S13 are arranged in the direction of the drum axis of the optical unit 32. By the detection of the reference position by the sub-scanning reference position sensor S11, the optical unit 32 is kept standing still; from this sub-scanning reference position, sub-scanning is started, and sub-scanning is stopped after moving by an amount corresponding to the image size, to be moved to return to the sub-scanning reference position.

In the paper exit section 50, transport rollers 52 and 53, a transport guide 54, the separation guide 51, and an exit shutter 55 are arranged. The transport rollers 52 and 53 are driven together by a carrying out motor M8. The separation guide 51 is moved up and down by a separation guide up/down motor M9; at the upper position, a finger portion 51a of the separation guide 51 picks a photosensitive material off the drum, and at the lower position, the photosensitive material is accumulated. The opening and closing of the separation guide 51 are detected by a separation guide open sensor S14 and a separation guide close sensor S15 respectively. In the exit path of the photosensitive material, a separation jam sensor S30 is provided.

The exit shutter 55 is opened and closed by an exit shutter motor M10. The opening and closing of the exit shutter 55 are detected by an exit shutter open sensor S16. The exit shutter 55 determines the ejection timing of a photosensitive material, and the photosensitive material is conveyed out to the developing unit 4 by the opening of the exit shutter 55 at a specified timing. Further, an exit sensor S31 for detecting a photosensitive material being fed into the developing unit 4 is provided.

The accumulating section 60 is disposed at a position under the paper exit section 50; by the downward movement of the separation guide 51, a photosensitive material hangs down in the accumulating section 60. By accumulating a photosensitive material at a higher speed (than the development transport speed) in this way, the photosensitive material is fed into the developing unit 4 without being damaged.

Figure 14:
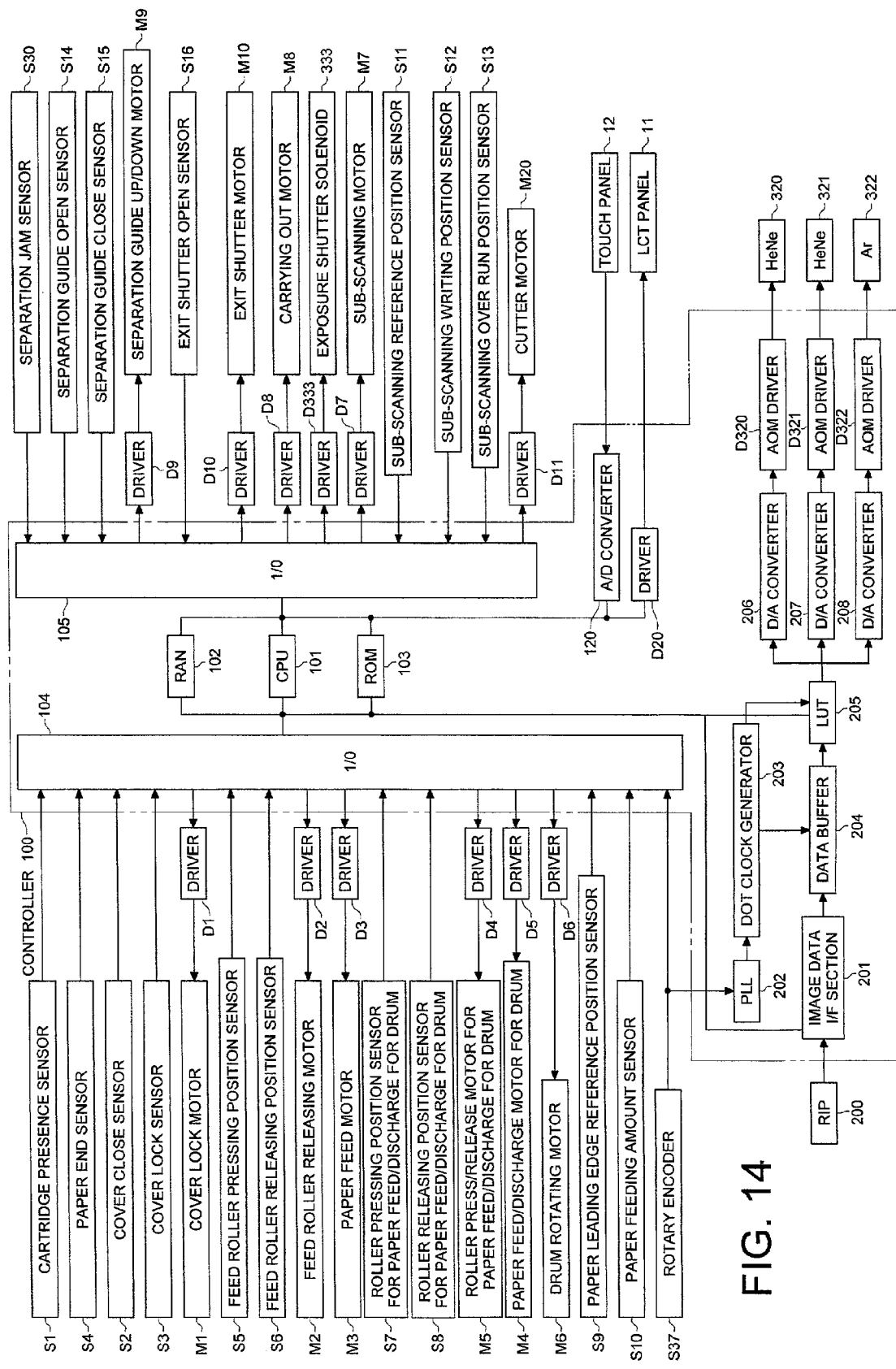
FIG. 14 is a block diagram showing the electrical structure of an apparatus of an example of the embodiment of this invention.

In FIG. 14, the electrical structure of this apparatus is shown as a block diagram. As shown in this FIG. 14, a control section 100 comprises a CPU 101, a RAM 102, and a ROM 103, and is connected through I/O ports 104 and 105 to various sensors and actuators, to control the actuators on the basis of information from the sensors.

As for the sensors, the aforesaid cartridge presence sensor S1, cover close sensor S2, cover lock sensor S3, paper end sensor S4, feed roller pressing position sensor S5, feed roller releasing position sensor S6, roller pressing position sensor for paper feed/exit to drum S7, roller releasing position sensor for paper feed/exit to drum S8, paper leading edge reference position sensor S9, paper feeding amount sensor S10, rotary encoder 37, sub-scanning reference position sensor S11, sub-scanning writing position sensor S12, sub-scanning overrun position sensor S13, separation guide open sensor S14, separation guide close sensor S15, exit shutter open sensor S16, and separation jam sensor S30 are connected. Besides, an exit sensor S31, which is not shown in this drawing, is also connected.

As for the actuators, the cover lock motor M1, feed roller releasing motor M2, paper feed motor M3, cutter motor M20, paper feed/discharge motor for drum M4, roller releasing motor for paper feed/discharge for drum M5, drum rotating motor M6, sub-scanning motor M7, exposure shutter solenoid 333, carrying out motor M8, separation guide up/down motor M9, exit shutter motor M10 are connected, and are driven through the drivers D1, D2, D3, D11, D5, D4, D6, D7, D333, D8, D9, and D10 respectively.

Further, in the operation section 8, the liquid crystal panel 11 is controlled by a driver D20, to display the operational state of the color proofing apparatus. Further, an instruction given by an operation from the touch panel 12 is transmitted to the CPU 101 as digital information by an A/D converter 120.

Digital image information is sent from an RIP 200 connected externally through an image data I/F section 201 to a data buffer 204. On the other hand, in synchronism with an output signal of a PLL 202 based on the photosensitive material transport information from the rotary encoder 37, the digital image information is given to AOM drivers D320, D321, and D322 from the data buffer 204 through an LUT (look-up table) 205 and D/A conversion sections 206 to 208 by means of dot clocks from a dot clock generation section 203, and by these AOM drivers D320, D321, and D322, the red laser light source (He—Ne) 320, the green laser light source (He—Ne) 321, and the blue laser light source (Ar) 322 are driven respectively.

Now, halftone image data of the colors (C, M, Y, and K) produced by the RIP 200 are transmitted to the image data I/F section 201, where they are converted from the RIP I/F format into the exposure format, and are accumulated in the data buffer 204. After image data for one frame have been accumulated in the data buffer 204, exposure for all colors are done simultaneously.

At that time, corresponding to a minimum writing dot by a laser beam (called a pixel) in exposure, data of C, M, Y, and K prints of a printed object composed of 16 combinations are given as shown in FIG. 15; that is, the data are converted into the combinations of the laser intensity of R, G, and B designated by the LUT 205, and exposure is carried out for each pixel as a unit where laser beams of the respective three wavelengths overlap one another.

For example, in the case where the laser driving is to make digital modulation composed of on and off states only, because the laser intensity becomes either 0 (the laser does not emit light) or 100 (the laser emits light of most suitable quantity for the photosensitive material), it is unnecessary to make the LUT 205 capable of being set by a user. However, in that case, the developed color densities of C, M, Y, and K of a photosensitive material are fixed, and a photosensitive material adapted to a standard ink density is to be used, which makes it impossible to be adapted to the dispersion of ink etc. depending on the printing conditions and to the density difference caused by the ink makers being different.

In contrast with that, in this apparatus, analogue modulation having a gray level characteristic is employed in laser driving, while it is provided the LUT 205 to make it possible to freely set the beam intensities of the R, G, and B lasers corresponding to the data of C, M, Y, and K of a printed object which have been sent as 16 ways of combination in such a manner as to make the developed colors have optimum densities respectively. In addition, because all are developed to the same black in the cases where K print is included in the data, the reproducible colors which can be changed with respect to the LUT becomes of 9 kinds. In the case where the dispersion of ink etc. depending on the printing conditions and the density difference caused by the ink makers being different are to be corrected, it is desirable to use a photosensitive material having a color developing density higher than the standard ink density, because it broadens the range of adaptation.

Incidentally, by the operation of the touch panel 12, the content of the LUT 205 can be displayed on the liquid crystal panel 11 through the CPU 101. Further, on the display screen, by the operation of the touch panel 12, the content of the LUT 205 can be arbitrarily changed.

The part composed of the CPU 101, the LUT 205, the liquid crystal panel 11, and the touch panel 12 is an example of the embodiment of an adjusting means in this invention. Further, it is an example of the embodiment of rewriting means in this invention. The LUT 205 is an example of the embodiment of a look-up table in this invention. The liquid crystal panel 11 is an example of the embodiment of a display means in this invention. The part composed of the CPU 101, image data I/F section 201, the liquid crystal panel 11, and the touch panel 12 is an example of the embodiment of a data modifying means in this invention.

As shown in FIG. 16 for example, the LUT 205 memorizes the data which specify the correspondence between the reference colors in printing, namely, Y (yellow), M (magenta), C (cyan), B (blue), G (green), R (red), K (black), GY (gray), and W (white), and the intensity compositions of light from the light sources for exposing a photosensitive material to these reference colors, namely, R (red) light, G (green) light, and B (blue) light.

In FIG. 16, in respect of a photosensitive material of the direct positive type, an example of correspondence between the basic colors Y to W and the intensity compositions composed of the respective proportions of the laser beams R, G, and B is shown. In respect of a photosensitive material of a negative type, the numerical values in the table become the complementary numbers against 100. Hereinafter, explanation will be given for the cases of a photosensitive material of the direct positive type, but it is quite the same also in the case of a photosensitive material of a negative type except that the numerical values become the complementary numbers against 100.

The hues of C, M, Y, and K inks of printed objects are different depending on the brand of inks used in printing etc. Therefore, in this apparatus, the intensity compositions composed of the respective proportions of the laser beams R, G, and B corresponding to the basic colors Y to W are set in accordance with the ink or the preference of the user. This is what is called the color correction in this specification. Brands of inks etc. correspond to channels to be described below.

There are some cases where a special ink is prepared and printing is done with a dedicated printing plate for a special color, pink for example, which is difficult to exactly present by the combinations of halftone dots of the basic colors C, M, Y, and K of printing inks because of the generation of impurity. In such cases, as shown in FIG. 17, the respective proportions a, b, and c of the laser beams R, G, and B in the intensity composition corresponding to the special color SP are to be set. Because a silver halide photosensitive material is used, it is possible to produce an approximate color by the multiplication of colors.

When a specified key is pressed on the initial menu screen of the liquid crystal panel 11 with the touch panel 12, a color correction setting screen as shown in FIG. 18 for example is displayed. That is, a screen including an LUT 112 of a channel, the channel 1 for example, and numerical keys 113 is displayed. The numerical values of the LUT 112 are made to be standard values in the default state. Besides, as for the LUT 112, an example including no special color is shown.

By touching the desired basic color on this screen, the proportion values of the laser beams in the intensity composition corresponding to the basic color are changed by means of the numerical keys 113. The settlement of the numerical values is carried out by an enter key 114. An error in the numerical values is corrected by re-inputting after clearing by a clear key 115.

For example, in order to correct the color development of the basic color Y to a reddish color, by changing the proportion of the laser beam G in the intensity composition into 95% for example and making an exposure, Y mixed with a little developed color M can be produced, which was supposed to be a perfect yellow properly. In order to correct the color development of the basic color M to a bluish color, the proportion of the laser beam R in the intensity composition is changed into 92% for example, and in order to correct the color development of the basic color C to a greenish color, the proportion of the laser beam B in the intensity composition is changed into 97% for example. In respect of other basic colors also, as occasion demands, the adjustment of the proportion of the laser beam in the intensity composition is carried out in the same way. In addition, for the photosensitive material, one having a photosensitive layer capable of developing each of the colors of higher density than that of printing inks is used. By doing this, hues which are of high fidelity to the ink colors can be obtained.

If the ground color of the printing medium, that is, the ground color of the printing paper is different from the ground color of the photosensitive material, the color of the basic color W is modified to agree with it. For example, if the ground color of the printing paper is milky white, the intensity composition proportions of the laser beams R, G, and B are set so as to make such a hue. At that time, the R, G, and B components of this ground color are added to the R, G, and B components of all the other basic colors. In this way, a color proof which is adapted to not only the hue of the inks but also the ground color etc. of the printing paper can be produced.

When the adjustment of all the basic colors is finished for one channel, the operator is now in the state where the color correction for the next channel is possible. Thus, as occasion demands, a color correction is carried out in the same way also for the next channel. When all color corrections have been finished, the operator returns to the initial menu screen by pressing the menu key 116.

When a color proof is produced, an LUT which corresponds to the inks and paper to be used in printing is used. For that purpose, by the operation of specified keys on the menu screen, the color correction channel designating screen is displayed on the liquid crystal panel 11. By doing this, a screen as shown in FIG. 19 for example is displayed.

Figure 19:
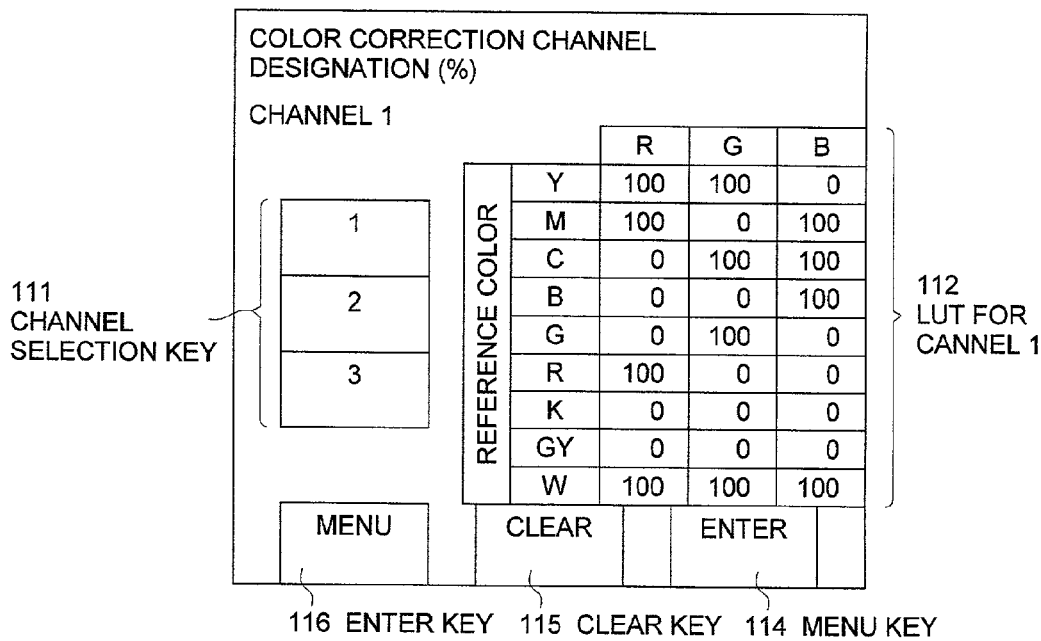
FIG. 19 is a drawing showing the screen for color correction channel setting in an apparatus of an example of the embodiment of this invention.

As shown in this FIG. 19, on the screen, channel selection keys 111 are displayed, while the content of the LUT 112 of one channel, the channel 1 for example, is displayed. On this screen, by selecting a desired channel with the channel selection keys 111, the LUT of the corresponding channel is displayed. Further, the content of the displayed LUT is confirmed, and the enter key 114 is pressed to settle the LUT to be used in producing the color proof.

In a printing machine, what is called a dot gain phenomenon in which printed dots become larger-sized than the dots in the halftone dot plate occurs. Also the dot gain depends on the ink and the printing paper. Therefore, by using the liquid panel 11 and the touch panel 12, a dot gain corresponding to the dot gain in printing is given to image data in the image data I/F section 201 or image data in the LUT 205 through the CPU 101. In addition, the above-mentioned giving of a dot gain is equivalent to the correction of the color tone characteristic or the correction of the gradation characteristic. Besides, also it is appropriate, for the modification of image data, that, after it is done directly from the operation section of the RIP main body, the corresponding curve is memorized in this apparatus, and the channel is made to be able to be read out.

Figure 20:
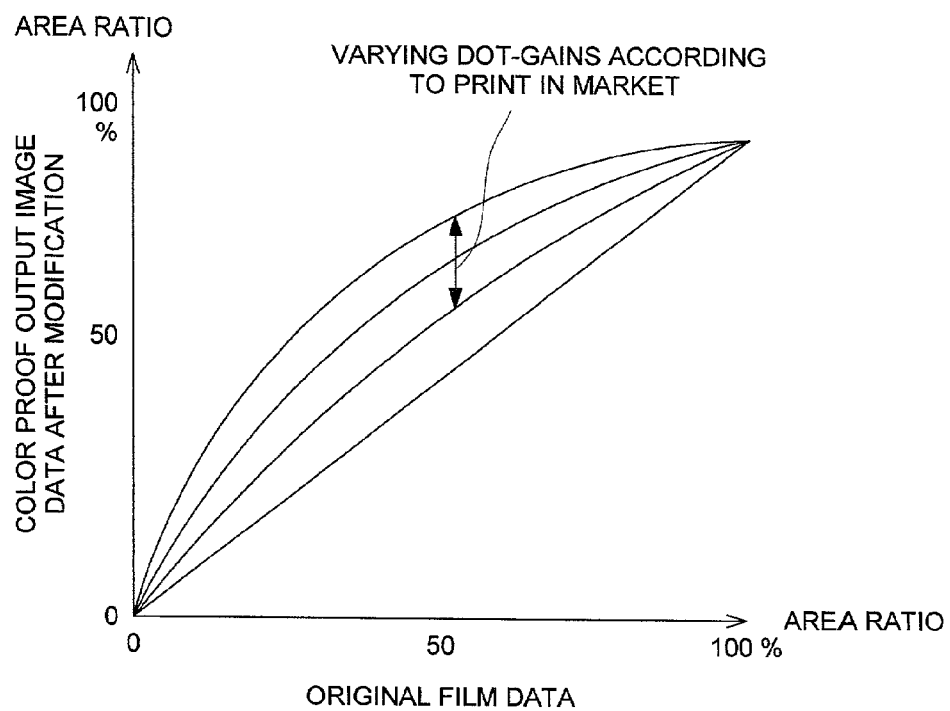
FIG. 20 is a graph showing an example of a dot gain curve in this example of the embodiment.

To state it concretely, as shown in FIG. 20, it is carried out by displaying a plurality of curves each of which may be expected to be a dot gain curve and selecting suitable one out of them. In another way, it is appropriate to draw an arbitrary dot gain curve through the touch panel.

(Black Color Reduction Correction Processing)

In the following, black color reduction correction processing, which is a characteristic part of this example of the embodiment, will be explained with reference to FIG. 1 and FIG. 2.

Figure 1:
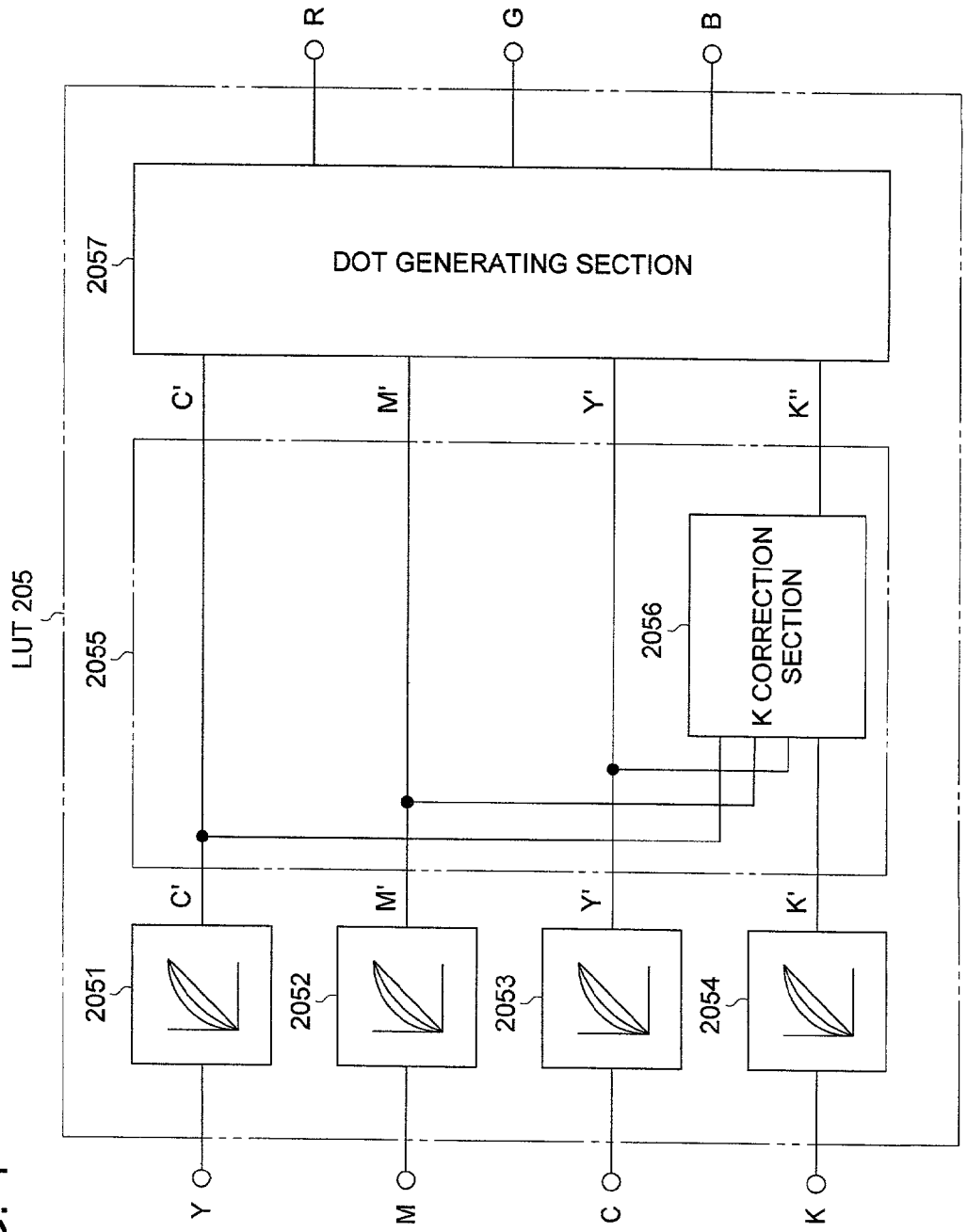
FIG. 1 is a block diagram showing the electrical structure of an apparatus of an example of the embodiment of this invention.
Figure 2:
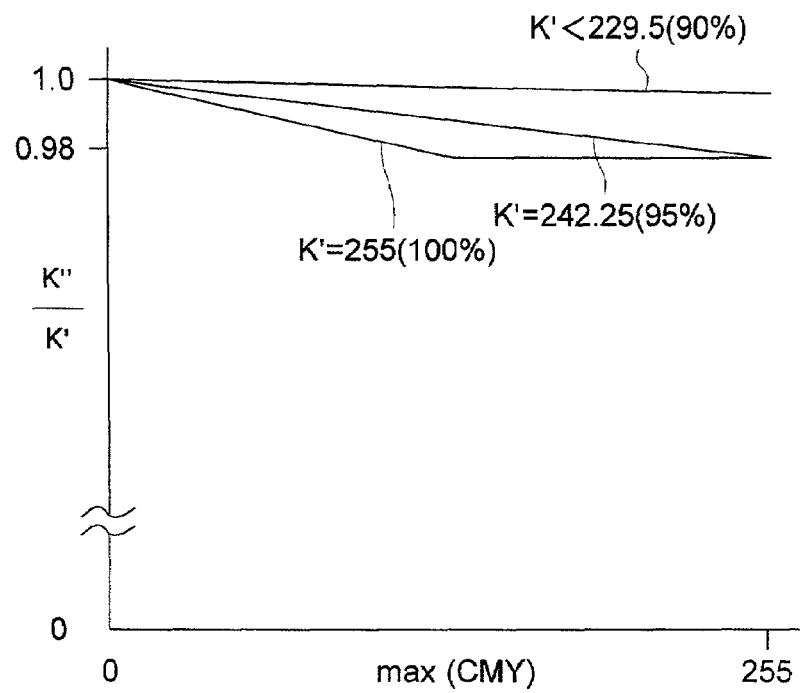
FIG. 2(a) and FIG. 2(b) are characteristic graphs showing respectively the electrical characteristics of an apparatus of an example of the embodiment of this invention.
Figure 2:
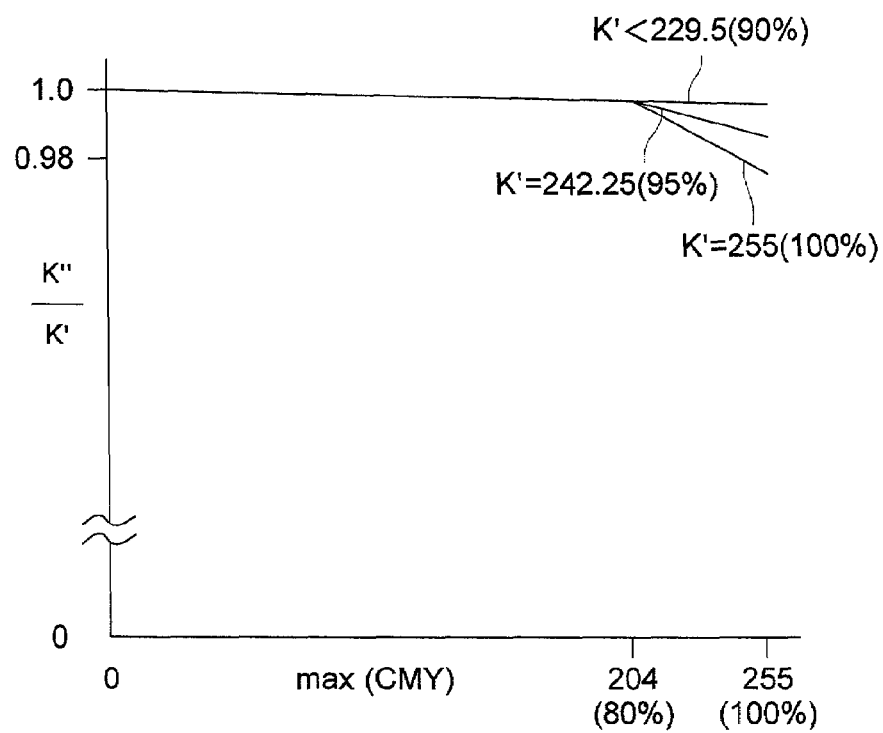

FIG. 1 is a functional block diagram showing functionally the LUT 205 making up the data converting means for practicing the black color reduction processing in this example of the embodiment.

In this drawing, 2051 to 2054 denote tables (dot gain tables) for generating C', M', Y', and K' by giving dot gains to C, M, Y, and K respectively.

Further, the LUT 205 can be used likewise also for a gradation correction/color tone correction in which it is used as a four-dimensional LTJT etc. memorizing values of C', M', Y', and K' after correction for each input point in a four dimensional lattice of C, M, Y, and K.

2055 carries out a correction to lower K' in a definite proportion to generate corrected K" for C', M', Y', and K' which have been corrected in terms of gradation characteristic or color tone characteristic, if K' is not smaller than a first boundary value and the maximum value of C', M', or Y' is not smaller than a second boundary value. Further, in the halftone dot generation section 2057, the halftone image data of halftone dot area ratios are produced and outputted on the basis of the image data of the corrected K", and C', M', and Y'.

In the description described above, it is desirable that the first boundary value for the K', to which black color reduction correction processing is applied, is not smaller than 50% and smaller than 100% as converted into a halftone dot area ratio expressed by a percent value. In each of FIG. 2(a) and FIG. 2(b), it is shown as an example, how black color reduction processing is practiced in the case where K' is not smaller than 90% (229.5 for image data of 0 to 255). In addition, in FIG. 2(a) and FIG. 2(b), three kinds of cases where K'<90%, K'=95%, and K'=100% are shown for example, the degree of correction processing is varied in accordance with the value of K'.

Further, it is desirable that the second boundary value concerning the maximum value (max(CMY)) of C', M', or Y' as a condition for applying black color reduction processing is not smaller than a boundary value as converted into a halftone dot area ratio expressed by a percent value. In FIG. 2(a), it is shown as an example how black color reduction processing is practiced in the case where the maximum value of C', M', and Y' is not smaller than 0%. Further, in FIG. 2(b), it is shown as an example how black color reduction processing is practiced in the case where the maximum value of C', M', and Y' is not smaller than 80% (204 for image data of 0 to 255).

Further, it is desirable that the correction to lower K' by black color reduction processing is done in accordance with the values of K' and max(CMY), and at the same time, it is practiced so as to make the amount of reduction be 10% of the value of K' at the largest. In FIG. 2(a) and FIG. 2(b), it is shown as an example how the black color reduction processing of 2% (5.1 for image data of 0 to 255) at the largest is practiced.

In this case, in the case where K' is 100% (255 for image data of 0 to 255) and max(CMY) is 100% (255 for image data of 0 to 255), the largest black color reduction processing (2% in FIG. 2(a) and FIG. 2(b)) is practiced.

Further, if the first boundary value is smaller than the above-mentioned value, and if the maximum value of C', M', and Y' is smaller than the second boundary value, in order to make the color of letters etc. clear, black color reduction processing is not practiced at all (K"=K').

Further, at the point between the domain of the maximum practice of black color reduction processing and the domain of no practice of it, in order to prevent a phenomenon called a tone jump in which gradation becomes discontinuous, those domains are connected by a smooth characteristic curve as shown in FIG. 2(a) and FIG. 2(b).

The expression of K" generated by black color reduction processing is as follows. In the expression, it is employed as an example of a case where, in accordance with the example in FIG. 2(a), black color reduction processing is practiced for K' not smaller than 90% (229.5 for image data of 0 to 255), and for the maximum value of C', M', and Y' not smaller than 0%, and the black color reduction processing of 2% (5.1 for image data of 0 to 255) at the largest is practiced.

$$K''=K'-Km,$$

$$Km=((K'-229.5)/(255-229.5))\times(\max(CMY))/255)\times 5.1\times 2,$$

where Km is made to be 0 if Km becomes negative, and Km is made to be 5.1 if Km becomes larger than 5.1.

Besides, in the above-mentioned case, instead of the structure shown in FIG. 1, it is appropriate to employ a method in which K" is memorized in place of K' in a four-dimensional LUT to generate the values of C', M', Y', and K' after correction from C, M, Y, and K, and desired C', M', Y', and K" are obtained in a single step.

Further, another characteristic part of an example of the embodiment of this invention will be explained.

Figure 3:
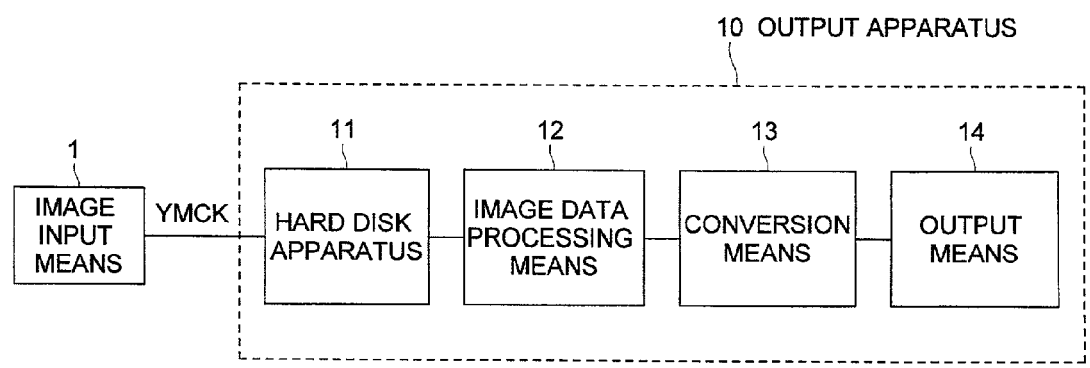
FIG. 3 is a block diagram showing an example of the embodiment of this invention.

FIG. 3 is a block diagram showing an example of the embodiment of this invention. In the drawing, 1 denotes an image inputting means for inputting image data; for example, there are some cases to be considered where image data are read out from a memory device in which image data are memorized, where image data which have been read by an image scanner are inputted, etc.

10 denotes an outputting machine for receiving image data Y, M, C, and K from the image inputting means 1 and outputting an image. In the outputting machine 10, 11 denotes a hard disk apparatus (HD) for memorizing data of Y, M, C, and K inputted, as one bit dot image for each of them after dot generating, from the image inputting means 1. 12 denotes an image data processing means for carrying out image processing of this invention for image data read out from said hard disk apparatus 11.

13 denotes a conversion means for receiving the output from the image data processing means 12, and carrying out conversion, for example, from Y, M, C, and K system to R, G, and B system.

14 denotes an output apparatus for receiving the output of the conversion means 13 and outputting an image. For this output apparatus, for example, a printer as a printing apparatus, a CRT as a display apparatus, etc. are used. The explanation of the operation of the apparatus having such a structure is as follows.

The Y, M, C, and K data which are outputted from the image inputting means 1 are outputted as one bit data for each of them. The Y, M, C, and K data outputted from the image inputting means 1 are stored successively in the hard disk apparatus 11. In this way, in the hard disk apparatus 11, image data of one frame are accumulated.

The image data processing means 12 carries out image processing of this invention for the inputted image data. Said image data processing means 12 checks each of Y, M, C, and K, and a mask signal Q, and in the case where any one of the colors Y, M, and C overlaps K (the state of black-overlaid print), makes K equal to zero (K=0) if the mask signal Q=1. That is, black is made not to overlap the others. To express this by an equation, when each of Y, M, C, and K takes a value of one of (1, 0) and the relation between another signal Q which takes a value of one of (1, 0) likewise is expressed by $$((Y \text{ or } M \text{ or } C) \text{ and } K) \text{ and } Q=1,$$

K is made to be equal to zero (K=0).

According to this equation, if at least an image of one of the colors Y, M, and C is present, the operation 'AND' for the signal of the one color and K is made and further the operation 'AND' is made for the result of said operation 'AND' and another signal Q is made; if the result of the further 'AND' operation is equal to 1, K is not to be outputted.

Figure 4:
FIG. 4 is a drawing for explaining a mask signal.

In this example of the embodiment, a mask signal is used for another signal Q; this mask signal is such one that makes a hole in the black area to make another color visible. The pattern of a mask signal of this kind may be memorized in the hard disk apparatus 11, or may be memorized in other memory means. FIG. 4 is a drawing for explaining a mask signal. For a mask signal, as shown in the drawing, a random signal, a vertical stripe signal, a horizontal stripe signal, a grid signal, a halftone dot signal, etc. can be considered. A mask signal is used as a signal to mask a specified image in this invention.

Figure 5:
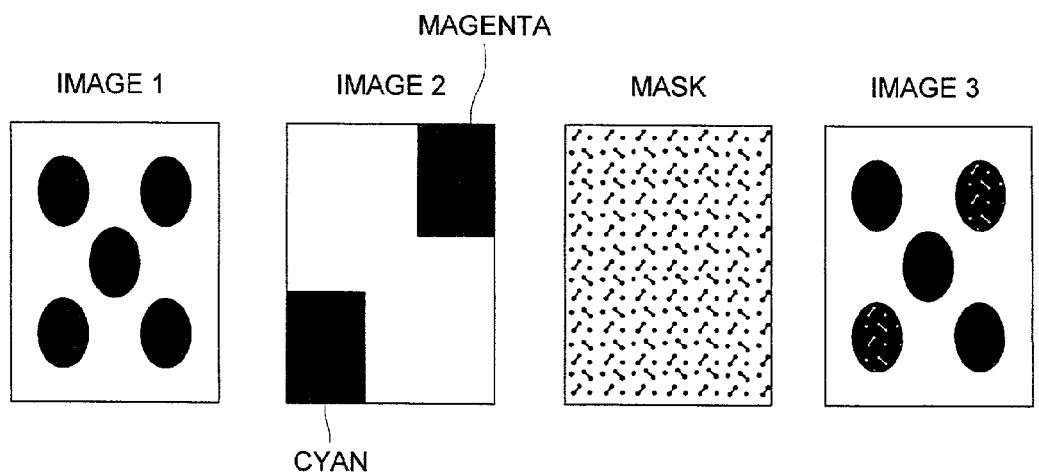
FIG. 5 is a drawing for explaining the action of this invention.

FIG. 5 is a drawing for explaining the action of this invention. As shown in the drawing, the image 1 is an image in which K is disposed in the parts of solid black circle. The image 2 is an image relating to the operation of (C or M), in which cyan and magenta images are disposed in the lower left part and the upper right part respectively. The 'AND' operation for a signal obtained by making the operation 'AND' for these two images and a mask signal is made. As the result of the 'AND' operation, concerning the area where it is equal to 1, K (black) is made to be "0". The result of this is the image 3; that is, in respect of the final output image, in the solid black circle area of K in the lower left part and the upper right part, portions where K=0 is produced in accordance with the mask image; in other words, in these parts those portions become transparent to be visible. As the result of this, it becomes possible to recognize the images which are present overlaid with K.

The image data processed in this way are inputted in the conversion means 13, where conversion from Y, M, and C to R, G, and B is carried out. The signals R, G, and B are inputted in the output apparatus 14, to be printed. As the result of this, the black-overlaid part becomes transparent to be visible, and K in the solid black area can be discriminated from K overlapping the other colors.

In this case, in the case where the mask image is any one of the vertical stripes, horizontal stripes, grid, halftone dots, it is necessary to take the period into consideration. In this case, for example, the period is made to be equivalent to the number of lines of the K print. Concerning the halftone dots, it is necessary to take also the angle into consideration. For example, the angle is made to be equal to that of K print. By doing this way, it is possible to eliminate the emergence of a moire etc.

Further, in this invention, in order to prevent halftone dots of K in an image area from disappearing, following condition can be added. That is, over the (n×n) pixels area centered on a pixel of object of a K signal, in the case where the K values of all pixels in the area are "1", K'=1, and in the case where at least one of them is "0", K'=0, and when another signal Q satisfies the expression ((Y or M or C) and K') and Q=1, K is made to be equal to zero (K=0). In addition, for the range of (n×n) pixels, for example, it is made to have a size not smaller than one halftone dot of K.

Figure 6:
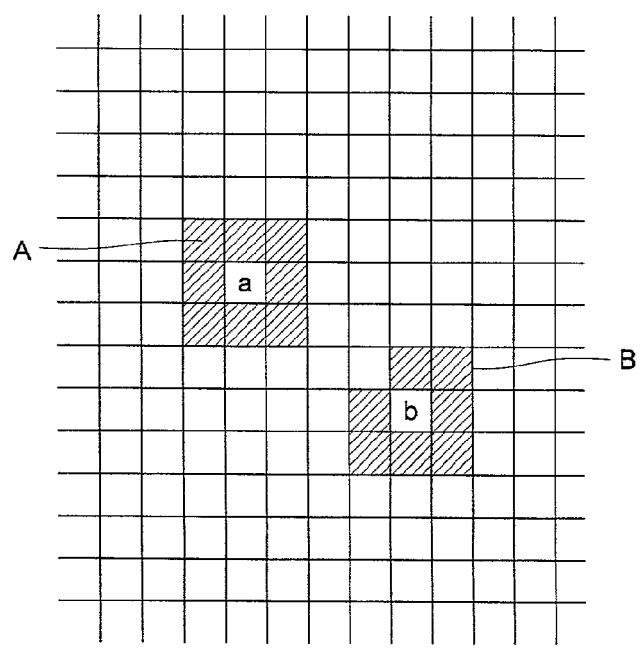
FIG. 6 is a drawing for explaining the action of this invention.

FIG. 6 is a drawing for explaining the action of this invention. For example, it is assumed that there are domains of (3×3) pixels as shown in A and B. In the case of A, "a" is a pixel of K', and in the case of B, "b" is a pixel of K'. In the case where all the pixels surrounding "a" are black as shown in A, K' is made to be 1 (K'=1), and in the case where even one of the surrounding pixels is white, K' is made to be zero (K'=0). In the case where K'=1, if it overlaps the mask signal, K is made to be equal to zero (K=0). In the case where K'=0, because the result of 'AND' operation with the mask signal becomes "0", in this case, K remains equal to 1 (K=1), and it can be prevented that the halftone dot of K disappears.

Figure 7:
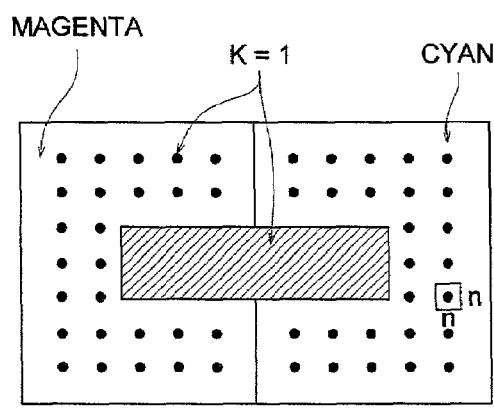
FIG. 7(a) and FIG. 7(b) are drawings for explaining the mechanism of preventing halftone dots of K from disappearing.
Figure 7:
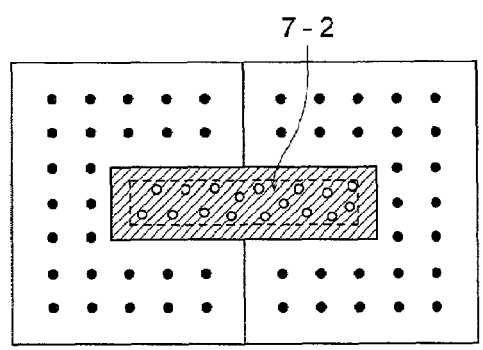

FIG. 7(a) and FIG. 7(b) are drawings for explaining the mechanism to prevent halftone dots of K from disappearing. In the drawing FIG. 7(a), it is only in the area of (7-2) shown in the drawing FIG. 7(b) that K is "1" for all pixels in any (n×n) domain. The hatching portion in the drawing FIG. 7(a) is K (black). Hence, only in the area (7-2), K is made to be zero (K=0) as shown in the drawing FIG. 7(b) in accordance with the mask signal, and in other area, K is kept to be 1 (K=1); that is, it is possible to prevent the halftone dots of K from disappearing. Further, in this case, for the way to check the (n×n) domains, by using a thinned out signal of K, the processing speed can be improved.

In the above-mentioned example of the embodiment, the case where a printing apparatus is used as an output apparatus is taken for instance, but this invention is not limited to this; any other apparatus, for example, a CRT can be used. Further, in the above-mentioned example of the embodiment, the case where the image data processing means 12 is arranged behind the hard disk apparatus is taken for instance, but this invention is not limited to this; it is possible that the image data processing means 12 is arranged behind the image inputting means 1 or before the hard disk apparatus in the outputting machine 10.

Figure 21:
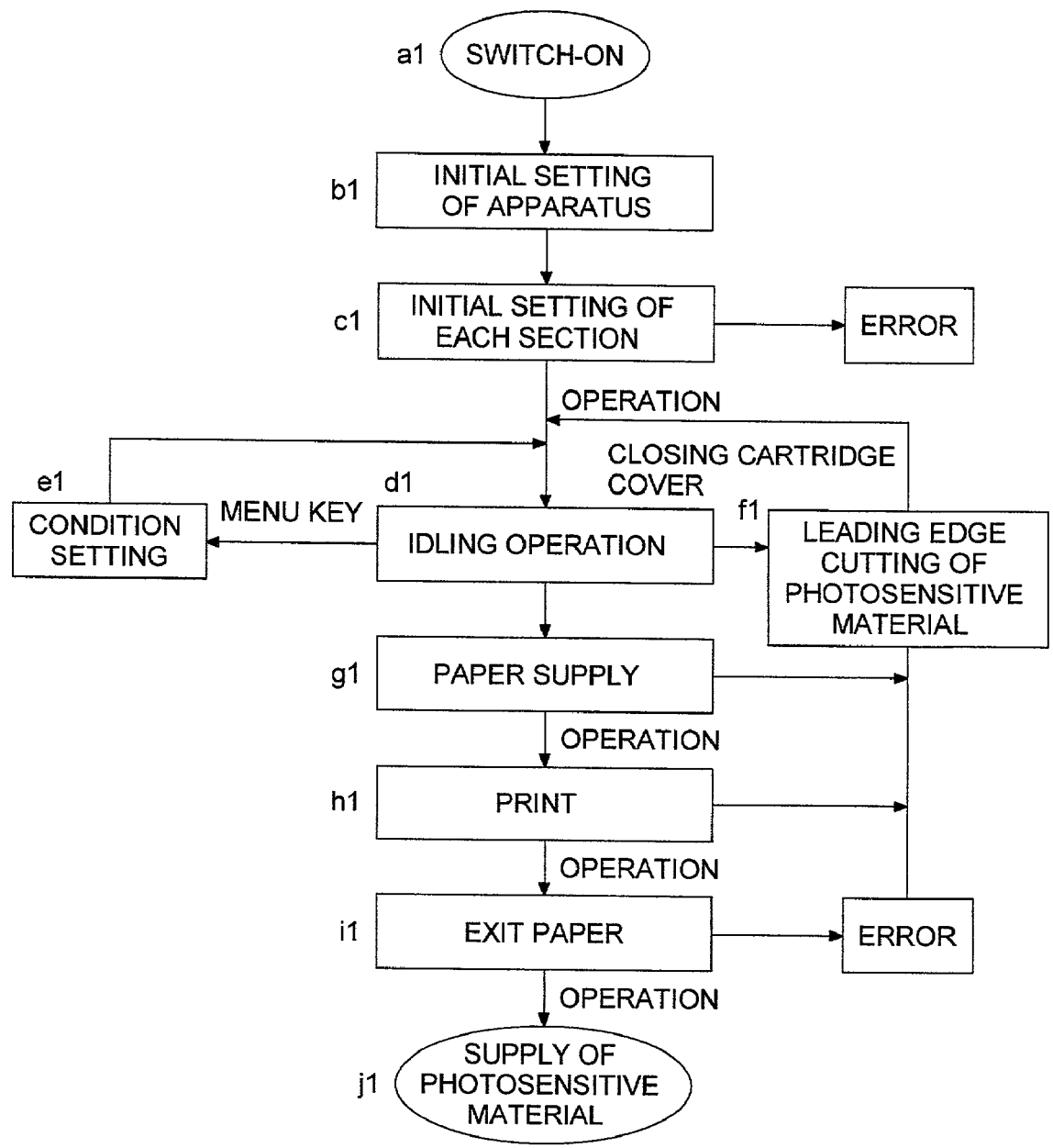
FIG. 21 is a flow chart showing an operation of an apparatus of an example of the embodiment of this invention.
Figure 22:
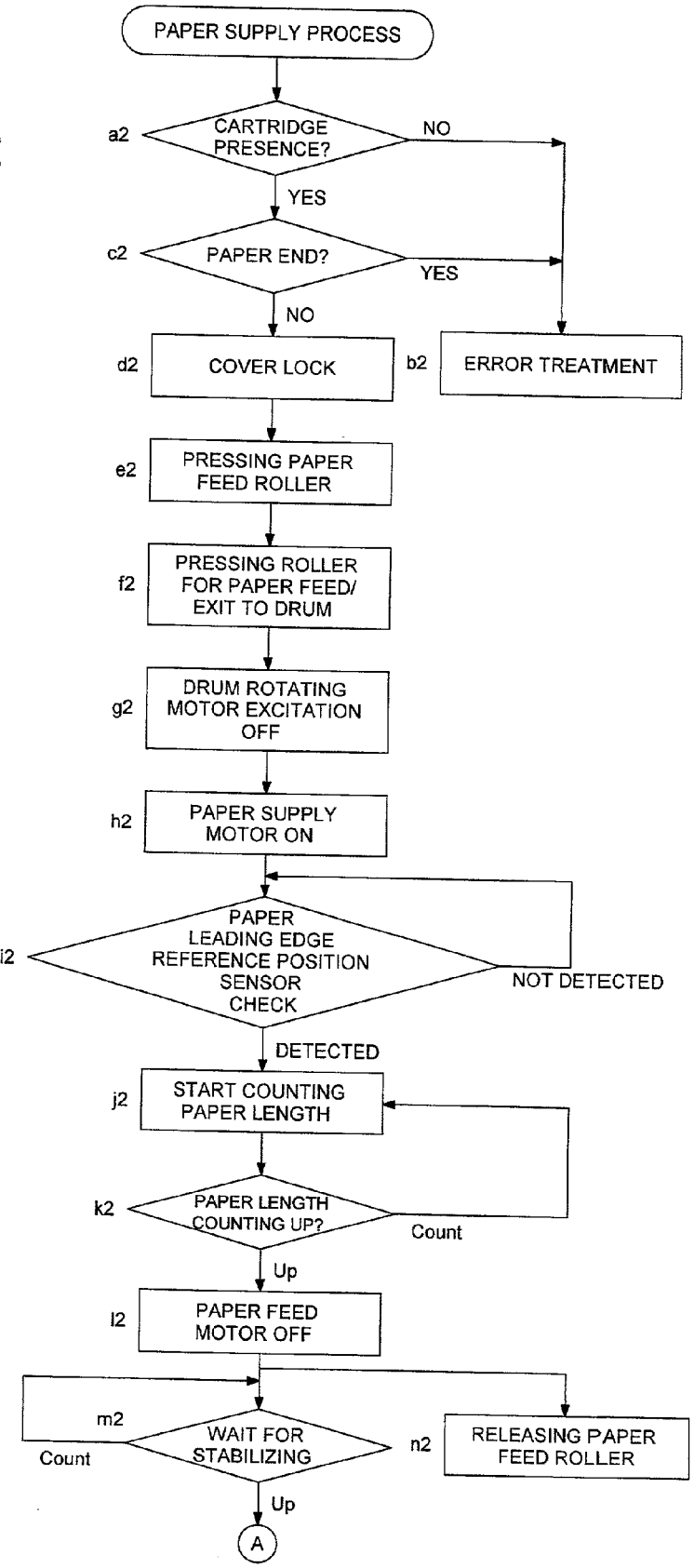
FIG. 22 is a flow chart showing an operation of an apparatus of an example of the embodiment of this invention.
Figure 23:
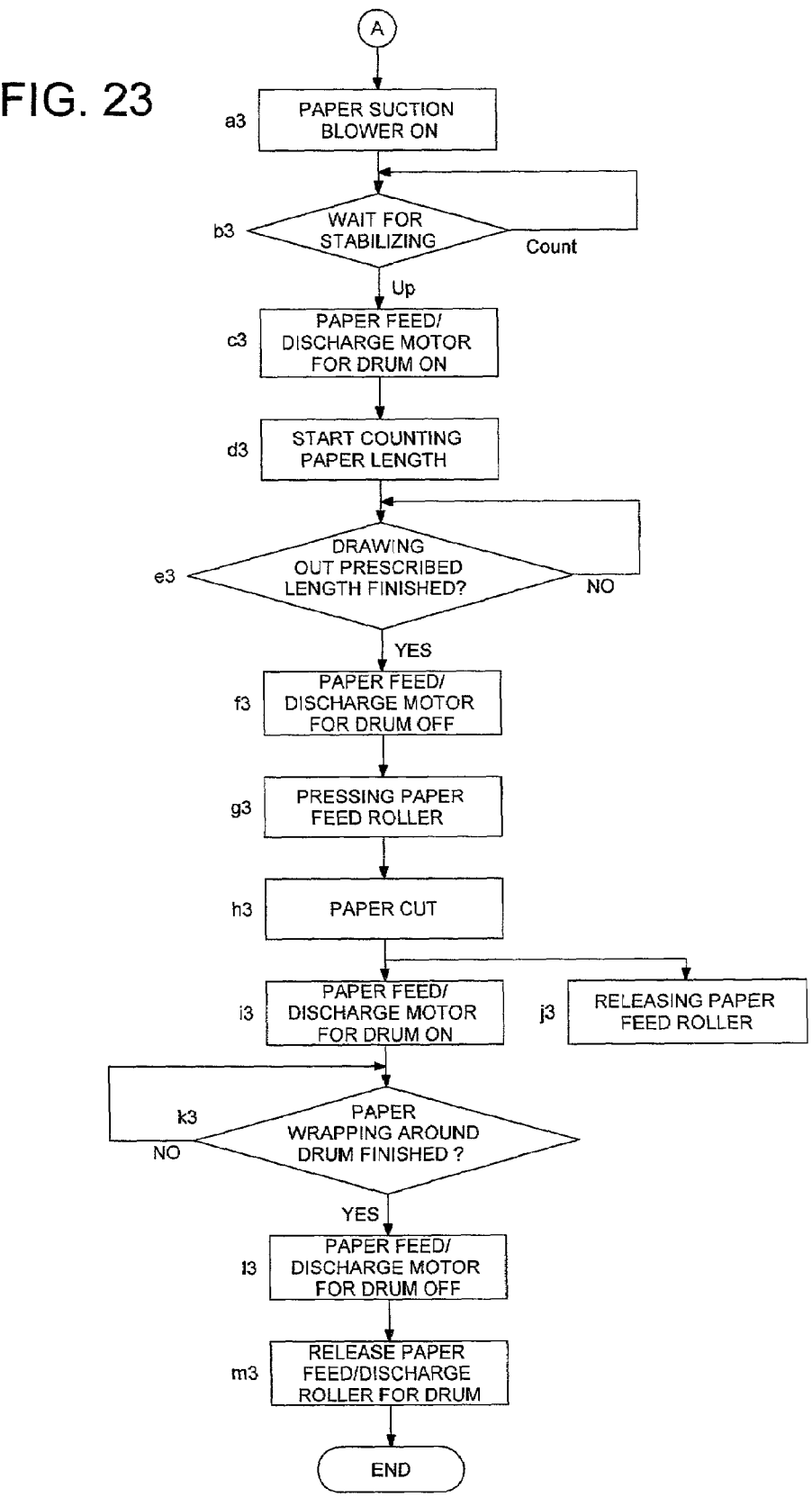
FIG. 23 is a flow chart showing an operation of an apparatus of an example of the embodiment of this invention.
Figure 24:
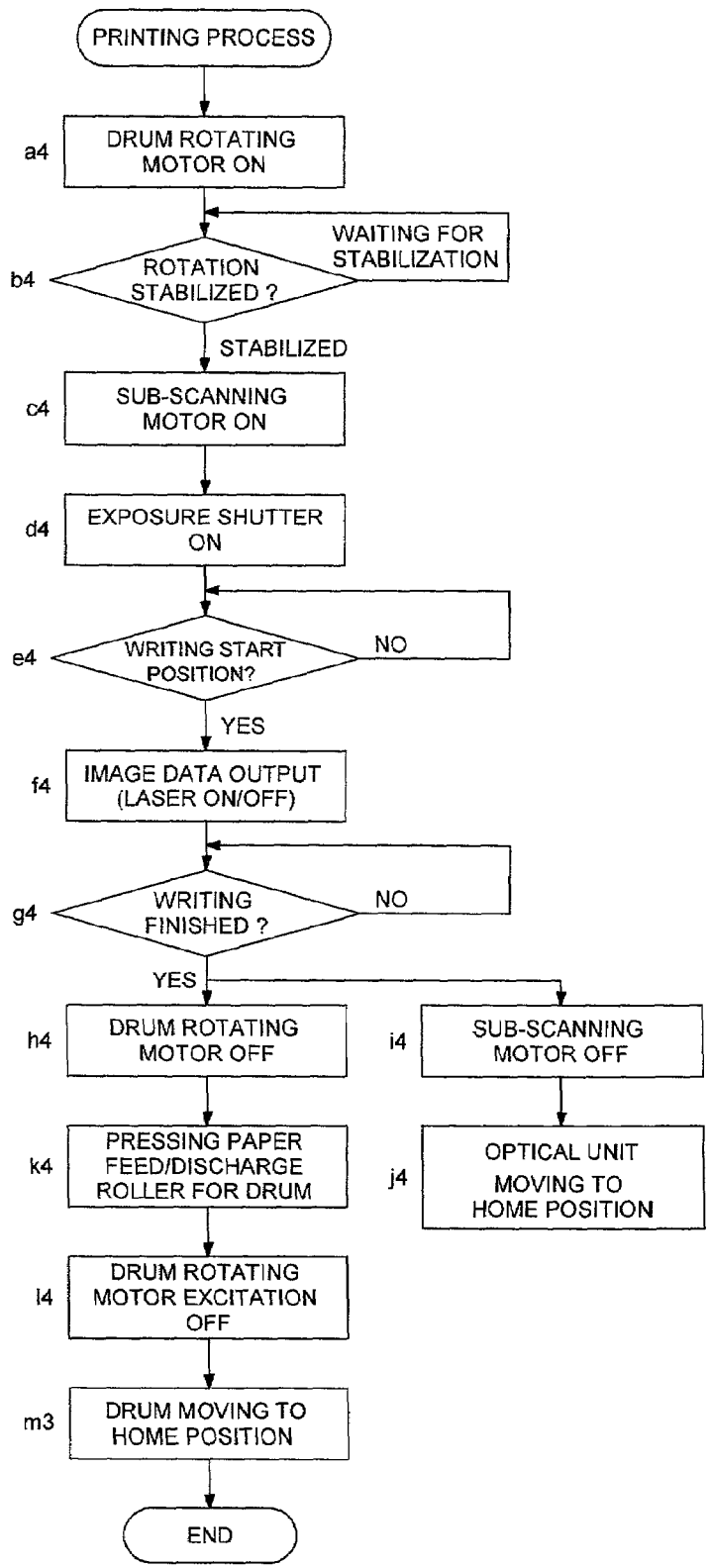
FIG. 24 is a flow chart showing an operation of an apparatus of an example of the embodiment of this invention.
Figure 25:
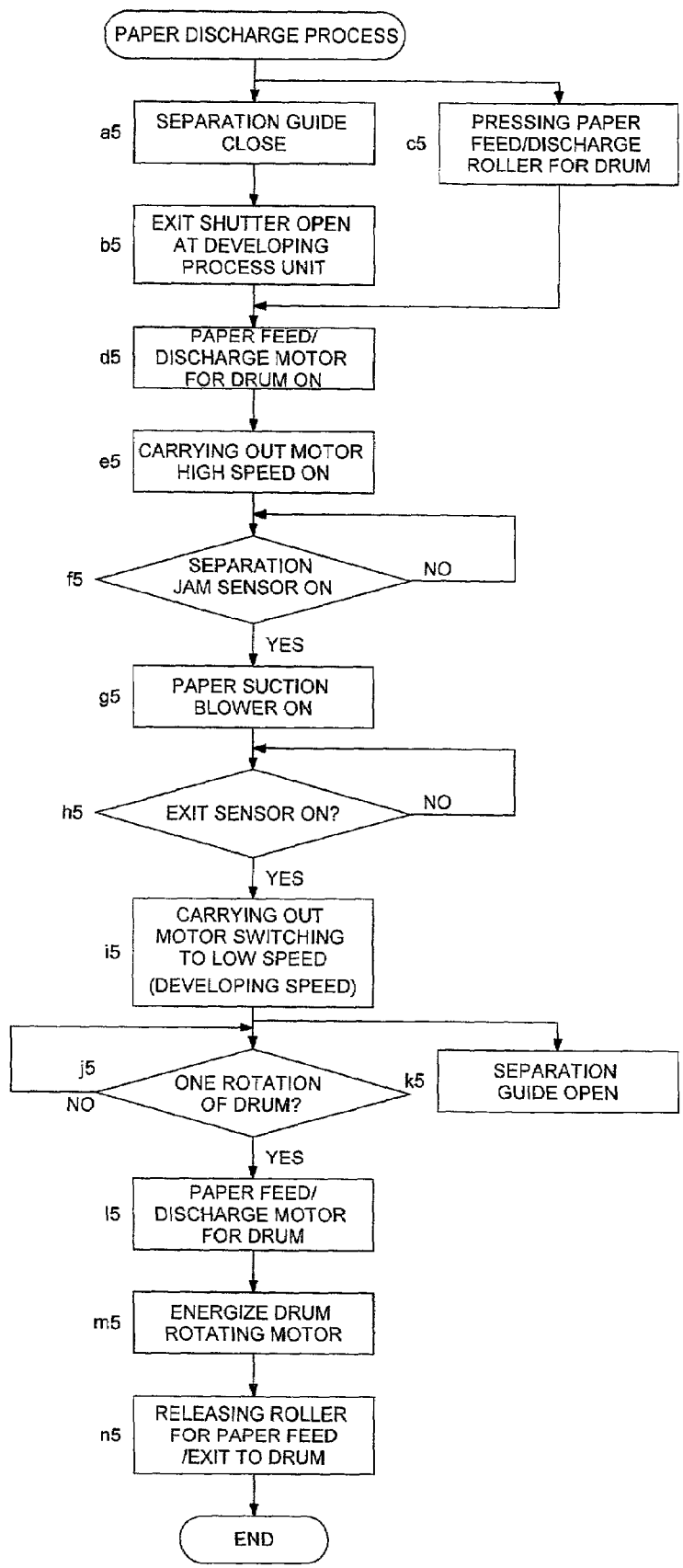
FIG. 25 is a flow chart showing an operation of an apparatus of an example of the embodiment of this invention.
Figure 26:
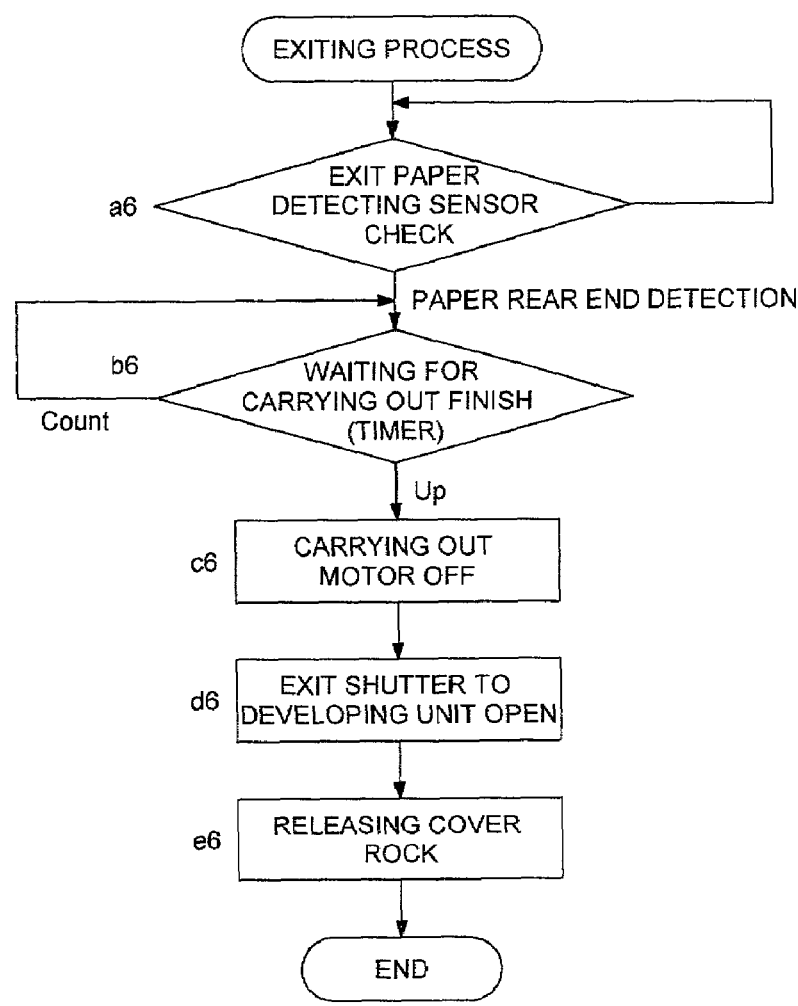
FIG. 26 is a flow chart showing an operation of an apparatus of an example of the embodiment of this invention.

Next, the operation of a color proofing apparatus will be explained on the basis of FIG. 21 to FIG. 26. FIG. 21 is a main flow chart of the operation of a color proofing apparatus, each of FIG. 22 and FIG. 23 is a flow chart showing the paper feed processing of a color proofing apparatus, FIG. 24 is a flow chart showing the print processing of a color proofing apparatus, FIG. 25 is a flow chart showing the paper discharge processing of a color proofing apparatus, and FIG. 26 is a flow chart showing the ejection processing of a color proofing apparatus.

First, the main operation of a color proofing apparatus will be explained. In the main flow chart of the operation of a color proofing apparatus shown in FIG. 21, when the main switch is turned ON in the step a1, the initial setting of the apparatus is carried out in the step b1, and further, the initial setting in each of the mechanism portions is carried out in the step c1; if an error occurs in this step, the function is stopped.

When the initial setting is finished, idling operation is carried out to enable remote processing (step d1). During this idling operation, condition setting can be done by the handling of the menu keys of the touch panel 12 in the operation section 8 (step e1); by this condition setting, local processing is enabled. In the case where the condition setting is not carried out by the handling of the menu keys of the touch panel 12, it is carried out remote processing in which image data outputted from the RIP are received and printing of the received image data is practiced.

In the case where photosensitive material runs out during the idling operation and replenishing is to be done, it is carried out the paper feed process in which the paper feed cover 9 is opened, the cartridge 10 is set, the paper feed cover is closed, and the fogged portion at the leading edge of the photosensitive material is cut off, and then the idling operation is resumed (step f1); if an error occurs in the paper feed process to cut off the fogged portion at the leading edge of the photosensitive material, the function is stopped.

Writing operation consists of paper feed (step g1), printing (step h1), and paper discharge (step i1), and when this writing process is finished, next photosensitive material sheet can be fed (step j1).

Next, the paper feed process of the color proofing apparatus will be explained. In the flow chart of the paper feed process of the color proofing apparatus shown in FIG. 22, the judgement of whether or not the cartridge 10 is present is carried out in step a2, and if the cartridge is not present, an error recovery process is carried out (step b2).

If the cartridge 10 is present, on the basis of the detection signal from the paper end sensor S4, the detection of the ending edge of the photosensitive material is carried out (step c2); if the ending edge of the photosensitive material is detected, an error recovery process is carried out (step b2).

If the ending edge of the photosensitive material is not detected, locking of the paper feed cover 9 is done (step d2), the paper feed roller 21b is pressed (step e2), and the paper feed/discharge roller for drum 23 is pressed (step f2). Further, the excitation of the drum rotating motor M3 is turned OFF, to make the drum 31 rotatable (step g2), and the paper feed motor M3 is rotated to feed the photosensitive material by the paper feed rollers 21a and 21b (step h2).

The leading edge of the photosensitive material is detected by the paper leading edge reference position sensor S9 (step i2); if the leading edge is detected, the measurement of the length of the photosensitive material based on the rotation of the encoder roller 25 is started on the basis of this detection taken as the reference (step j2), and while the photosensitive material is fed, the length of the photosensitive material is counted from the feeding amount of the photosensitive material; when the length reaches a specified value (step k2), the paper feed motor M3 is turned OFF (step l2), waiting for the stabilization for a specified time is done (step m2), while the releasing of the paper feed roller 21b is done (step n2), to make the photosensitive material be able to be transported by the rotation of the paper feed/discharge roller for drum 23 and the drum 31.

In the flow chart of the paper feed process of the color proofing apparatus shown in FIG. 23, the paper suction blower P1 is turned ON in the step a3, its stabilization is waited for (step b3), and the paper feed/discharge motor for drum M4 is turned ON after stabilization (step c3). By doing this, the paper is wound round the drum 31 as it is attracted to the drum 31.

The measurement of the paper length is started in the step d3, and after the drawing out of the paper to a specified length is finished (step e3), the paper feed/discharge motor for drum M4 is turned OFF in the step f3. The paper feed roller 21b is pressed in the step g3, the paper cutting is done in the step h3, and the paper feed/discharge motor for drum M4 is turned ON in the step i3, while the paper feed rollers 21a and 21b are released from being pressed in the step j3.

After the completion of the paper winding on the drum is waited for in the step k3, the paper feed/discharge motor for drum M4 is turned OFF in the step l3, and the paper feed/discharge roller for drum 23 is released from being pressed in the step m3.

In the flow chart of the printing process of the color proofing apparatus shown in FIG. 24, the drum rotating motor M6 is turned ON in the step a4, the stabilization of the rotation of the drum 31 is waited for (step b4), the sub-scanning motor M7 is turned ON (step c4), the exposure shutter 332 is turned ON (step d4), and the optical unit 32 is moved in the direction of the drum axis to make sub-scanning; further, the sub-scanning writing position is detected in the step e4, and the output of image data is carried out (step f4).

At this time, the red laser light source 320, the green laser light source 321, and the blue laser light source 322 emit light beams respectively on the basis of the data of the LUT of the channel which has been set, and exposure to an image having colors adapted to the inks in printing and/or the ground color of the printing paper is carried out.

When the writing of the image data is finished in the step g4, the drum rotating motor M6 is turned OFF (step h4), while the sub-scanning motor M7 is turned OFF (step i4), and the optical unit 32 is moved to the home position (step j4).

Further, the paper feed/discharge roller for drum 23 is pressed to the drum 31 in the step k4, the magnetization of the drum rotating motor M6 is turned OFF (step l4), and the drum 31 is moved to the home position by the rotation of the paper feed/discharge roller 23 (step m4).

In the flow chart of the paper discharge process of the color proofing apparatus shown in FIG. 25, the separation guide 51 is closed to be set at the pick-off position in the step a5, and the exit shutter 55 to the developing unit 4 is opened (step b5), while the paper feed/discharge roller for drum 23 is pressed (step c5).

The paper feed/discharge motor for drum M4 is turned ON to rotate the paper feed/discharge roller 23 in the step d5, and the carrying-out motor M8 is turned ON to feed the photosensitive material by high-speed transporting (step e5). It is judged whether or not the photosensitive material has produced a separation jam by the separation jam sensor S30 (step f5), and if a separation jam has not been produced, the driving of the suction blower P1 is stopped, to release the suction of the photosensitive material (step g5).

The discharge of the photosensitive material is detected by the exit sensor S31 in the step h5, and the carrying-out motor M8 is switched to a lower speed to be adapted to the processing in the developing unit 4 (step i5). Further, the drum 31 is rotated (step j5), while the separation guide 51 is opened (step k5).

The paper feed/discharge motor for drum M4 is turned OFF in the step l5, the magnetization of the drum rotating motor M6 is carried out to cause the drum 31 not to freely rotate (step m5), and the paper feed/discharge roller for drum 23 is released from being pressed, to finish the paper discharge process (step n5).

In the flow chart of the ejection process of the color proofing apparatus shown in FIG. 26, the ejection of the photosensitive material is detected by the exit sensor S31 in the step a6; if the detection of the trailing edge of the photosensitive material sheet is made, it is waited for the completion of the ejection of the photosensitive material for a specified time (step b6), the carrying-out motor M8 is turned OFF (step c6), the exit shutter 55 to the developing unit 4 is closed (step d6), and the paper feed cover 9 is released from being locked, to complete the ejection process of the photosensitive material (step e6).

The explanation has been given up to now for an example in which an AOM is used for each of the R light source, the G light source, and the B light source; however, the R, G, and B light sources are not limited to these, and also it is appropriate to compose all of the R, G, and B light sources of LD's (laser diodes).

Further, in producing a color proof, in accordance with the surface state of the printing paper, whether it is matte or glossy, it is desirable to switch over a photosensitive material to another one having a surface state adapted to the printing paper for use, because a color proof of high fidelity to the prints can be obtained.

(The Effect of the Invention)

As explained in detail up to now, in this invention, in producing a color proof by exposing a silver halide photosensitive material to a plurality of light sources having different wavelengths respectively on the basis of halftone dot image data, in respect of image data of C, M, Y, and K, the gradation characteristic or color tone characteristic is corrected, and for the corrected C, M, Y, and K, in the case where K is not smaller than a first boundary value and the maximum value of C, M, and Y is not smaller than a second boundary value, a correction to lower K in a specified proportion in accordance with the value of K and the maximum value of C, M, and Y, and halftone image data of halftone dot area ratios are produced and outputted on the basis of the image data of C, M, Y, and K, in which K has been corrected; therefore, a color proof capable of discriminating portions of black print only from portions of black-overlaid print can be produced.

Further, according to this invention, it is possible to recognize an image which is present overlaid with K, by selectively making K equal to zero (K=0) if images overlap one another.

Further, according to this invention, it is possible to prevent halftone dots of K in an image area from disappearing.

What is claimed is:

1. An apparatus for making a color proof based on an image signal including yellow, magenta, cyan and black component data Y, M, C, K for each pixel, comprising:
    an image signal input section to receive the image signal;
    a black component correcting section to correct the black component data K on the basis of the yellow, magenta and cyan component data Y, M, C for each pixel,
    wherein the black component correcting section compares a value of the black component data K with a first boundary value and compares a maximum value of the component data Y, M, C with a second boundary value, and when the value of the black component data K is larger than the first boundary value and the maximum value is larger than the second boundary value, the black component correcting section reduces the value of the black component data in accordance with the value of the black component data K and the maximum value,
    wherein the first boundary value is a value not smaller than 50% and smaller than 100%, the second boundary value is a value not smaller than 0% and smaller than 80% as converted into halftone dot area ratio expressed by percent,
    an image signal output section to output an image signal including yellow, magenta, cyan and corrected-black component data Y, M, C, K'; and
    a color proof making section to expose a silver halide light sensitive material based on the outputted image signal with a plurality of light sources different in wavelength and to make a color proof sheet for each color of yellow, magenta, cyan and black.

2. The apparatus of claim 1, wherein the color proof making section comprises a halftone dot generating section to generate and output halftone dot image data of halftone dot area ratios on the basis of the yellow, magenta, cyan and corrected-black component data Y, M, C, K', and the color proof making section conducts exposing based on the halftone dot image data.

3. The color proofing apparatus of claim 2, wherein the black component correcting section reduces the value of black component data by at most 10% of the value of black component data K before corrected.

4. The apparatus of claim 1, further comprising:
    a characteristic correcting section to correct at least one of a gradation correction and a color tone characteristic of the image signal.

5. The apparatus of claim 4, wherein the black component correcting section corrects the black component data K after the characteristic correcting section corrects one of the gradation correction and the color tone characteristic of the image signal.

6. An apparatus, for making a color proof based on an image signal including yellow, magenta, cyan and black component data Y, M, C, K for each pixel, comprising:
    an image signal input section to receive the image signal;
    a black component correcting section to correct the black component data K on the basis of the yellow, magenta and cyan component data Y, M, C for each pixel in accordance with a predetermined black component correcting condition;
    an image signal output section to output an image signal including yellow, magenta, cyan and corrected-black component data Y, M, C, K'; and
    a color proof making section to expose a silver halide light sensitive material based on the outputted image signal with a plurality of light sources different in wavelength and to make a color proof sheet for each color of yellow, magenta, cyan and black,
    wherein the image signal input section receives the image signal after the image signal is processed by a halftone dot generating, and when each of the yellow, magenta, cyan and black component data Y, M, C, K takes one of binary values (1, 0), the predetermined black component correcting condition is that the value of the black component data is made zero (K=0) when a following formula is satisfied:

((Y or M or C) and K) and Q=1, where Y, M, C, and K are the binary values of the yellow, magenta, cyan and black component data Y, M, C, K and Q is a control data taking one of binary values (1, 0).

7. An apparatus, for making a color proof based on an image signal including yellow, magenta, cyan and black component data Y, M, C, K for each pixel, comprising:
    an image signal input section to receive the image signal;
    a black component correcting section to correct the black component data K on the basis of the yellow, magenta and cyan component data Y, M, C for each pixel in accordance with a predetermined black component correcting condition;
    an image signal output section to output an image signal including yellow, magenta, cyan and corrected-black component data Y, M, C, K'; and
    a color proof making section to expose a silver halide light sensitive material based on the outputted image signal with a plurality of light sources different in wavelength and to make a color proof sheet for each color of yellow, magenta, cyan and black,
    wherein the image signal input section receives the image signal after the image signal is processed by a halftone dot generating, and when each of the yellow, magenta, cyan and black component data Y, M, C, K takes one of binary values (1, 0), the predetermined black component correcting condition is that the value of the black component data is made zero (K=0) when in the (n×n) pixel area centering on the objective pixel of the component data K, if all the pixels in the area are "1", a binary value K' is made equal to 1 (K'=1), and if there is any "0", K' is made equal to zero (K'=0), and a following formula is satisfied:

((Y or M or C) and K') and Q=1, where Q is a control data taking one of binary values (1, 0).

8. A method for making a color proof based on an image signal including yellow, magenta, cyan and black component data Y, M, C, K for each pixel, comprising the steps of:
receiving the image signal;
correcting the black component data K on the basis of the yellow, magenta and cyan component data Y, M, C for each pixel,
wherein the correcting step compares a value of the black component data K with a first boundary value and compares a maximum value of the component data Y, M, C with a second boundary value, and when the value of the black component data K is laroer than the first boundary value and the maximum value is larger than the second boundary value, the correcting step reduces the value of the black component data in accordance with the value of the black component data K and the maximum value,
wherein the first boundary value is a value not smaller than 50% and smaller than 100%, the second boundary value is a value not smaller than 0% and smaller than 80% as converted into halftone dot area ratio expressed by percent,
outputting an image signal including yellow, magenta, cyan and corrected-black component data Y, M, C, K';
exposing a silver halide light sensitive material based on the outputted image signal with a plurality of light sources different in wavelength; and
making a color proof sheet for each color of yellow, magenta, cyan and black.

9. The method of claim 8, wherein the black component correcting step reduces the value of black component data by at most 10% of the value of black component data K before corrected.

10. A method for making a color proof based on an image signal including yellow, magenta, cyan and black component data Y, M, C, K for each pixel, comprising the steps of:
receiving the image signal;
correcting the black component data K on the basis of the yellow, magenta and cyan component data Y, M, C for each pixel in accordance with a predetermined black component correcting condition;
outputting an image signal including yellow, magenta, cyan and corrected-black component data Y, M, C, K';
exposing a silver halide light sensitive material based on the outputted image signal with a plurality of light sources different in wavelength; and
making a color proof sheet for each color of yellow, magenta, cyan and black;
wherein the step of receiving the image signal is conducted after the image signal is processed by a halftone dot generating, and when each of the yellow, magenta, cyan and black component data Y, M, C, K takes one of binary values (1, 0), the predetermined black component correcting condition is that the value of the black component data is made zero (K=0) when a following formula is satisfied:

((Y or M or C) and K) and Q=1, where Y, M, C, and K are the binary values of the yellow, magenta, cyan and black component data Y, M, C, K and Q is a control data taking one of binary values (1, 0).

11. A method for making a color proof based on an image signal including yellow, magenta, cyan and black component data Y, M, C, K for each pixel, comprising the steps of:
receiving the image signal;
correcting the black component data K on the basis of the yellow, magenta and cyan component data Y, M, C for each pixel in accordance with a predetermined black component correcting condition;
outputting an image signal including yellow, magenta, cyan and corrected-black component data Y, M, C, K';
exposing a silver halide light sensitive material based on the outputted image signal with a plurality of light sources different in wavelength; and
making a color proof sheet for each color of yellow, magenta, cyan and black;
wherein the step of receiving the image signal is conducted after the image signal is processed by a halftone dot generating, and when each of the yellow, magenta, cyan and black component data Y, M, C, K takes one of binary values (1, 0), the predetermined black component correcting condition is that the value of the black component data is made zero (K=0) when in the (n×n) pixel area centering on the objective pixel of the component data K, if all the pixels in the area are "1", a binary value K' is made equal to 1 (K'=1), and if there is any "0", K' is made equal to zero (K'=0), and a following formula is satisfied:

((Y or M or C) and K') and Q=1, where Q is a control data taking one of binary values (1, 0).

* * * * *